United States Patent
Lim

(10) Patent No.: US 12,012,095 B2
(45) Date of Patent: Jun. 18, 2024

(54) VEHICLE AND METHOD OF CONTROLLING THE SAME

(71) Applicants: Hyundai Motor Company, Seoul (KR); Kia Motors Corporation, Seoul (KR)

(72) Inventor: Hyung Jun Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 321 days.

(21) Appl. No.: 17/130,577

(22) Filed: Dec. 22, 2020

(65) Prior Publication Data

US 2021/0316721 A1 Oct. 14, 2021

(30) Foreign Application Priority Data

Apr. 13, 2020 (KR) .......... 10-2020-0044472

(51) Int. Cl.
*B60W 30/09* (2012.01)
*B60W 40/09* (2012.01)
(Continued)

(52) U.S. Cl.
CPC .......... *B60W 30/09* (2013.01); *B60W 40/09* (2013.01); *B60W 60/0017* (2020.02);
(Continued)

(58) Field of Classification Search
CPC .. B60W 30/09; B60W 40/09; B60W 60/0017; B60W 2420/403; B60W 2554/4049; B60W 2710/18; B60W 30/0956; B60W 30/18145; B60W 30/18154; B60W 2050/143; B60W 2050/146; B60W 2552/53; B60W 2554/00; B60W 2552/50; B60W 30/08; B60W 10/18; B60W 10/20; B60W 40/06; B60W 40/10; B60W 40/105; B60W 50/10; B60W 50/14; B60W 2050/0022; B60W 2540/18; B60W 2556/45; B60W 2556/50; B62D 15/021; B62D 15/0265; B62D 15/0285; G06V 20/58; G06V 20/588; B60K 35/00;
(Continued)

(56) References Cited

U.S. PATENT DOCUMENTS

2008/0015772 A1* 1/2008 Sanma .................. G08G 1/161
2012/0053755 A1* 3/2012 Takagi ................ G01S 7/4808
(Continued)

FOREIGN PATENT DOCUMENTS

KR 2020-0086764 A 7/2020

*Primary Examiner* — Elaine Gort
*Assistant Examiner* — Ellis B. Ramirez
(74) *Attorney, Agent, or Firm* — Fox Rothschild LLP

(57) ABSTRACT

A vehicle control method includes determining whether a driving intention of a user is a U-turn intention or a left turn intention based on image information obtained by an imager. In response to determining that the driving intention of the user is the U-turn intention or the left turn intention an obstacle is detected that may cause a collision during a U-turn driving or a left turn driving based on the image information and obstacle information detected by an obstacle detector. In response, collision avoidance control is performed with the detected obstacle based on steering angle information of the vehicle.

20 Claims, 14 Drawing Sheets

(51) Int. Cl.
*B60W 60/00* (2020.01)
*B62D 15/02* (2006.01)
*G06V 20/56* (2022.01)
*G06V 20/58* (2022.01)

(52) U.S. Cl.
CPC .......... *B62D 15/021* (2013.01); *G06V 20/58* (2022.01); *G06V 20/588* (2022.01); *B60W 2420/403* (2013.01); *B60W 2554/4049* (2020.02); *B60W 2710/18* (2013.01)

(58) Field of Classification Search
CPC ........ B60K 2370/152; B60K 2370/157; B60K 2370/166; B60K 2370/63; B60R 21/0134; B60Y 2300/08
USPC .................................. 701/70, 301; 340/436
See application file for complete search history.

(56) References Cited

U.S. PATENT DOCUMENTS

| | | | |
|---|---|---|---|
| 2017/0016734 A1* | 1/2017 | Gupta | B60W 30/00 |
| 2017/0162049 A1* | 6/2017 | Lee | G08G 1/0112 |
| 2018/0099663 A1* | 4/2018 | Diedrich | B60W 30/09 |
| 2020/0180507 A1* | 6/2020 | Katou | G08G 1/163 |
| 2020/0189579 A1* | 6/2020 | Haque | B60W 30/095 |
| 2020/0216063 A1* | 7/2020 | Lim | B60W 30/095 |
| 2020/0302783 A1* | 9/2020 | Altendorfer | G08G 1/166 |
| 2020/0384988 A1* | 12/2020 | Park | G01S 13/87 |
| 2021/0061263 A1* | 3/2021 | Inaba | G06V 20/586 |
| 2021/0229702 A1* | 7/2021 | Tsuji | B60W 60/0016 |

\* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0044472, filed on Apr. 13, 2020, the disclosure of which is incorporated by reference in its entirety.

TECHNICAL FIELD

The present disclosure relates to a vehicle that prevents a collision with another vehicle, and a method of controlling the vehicle.

BACKGROUND

Generally, vehicles are driven on roads or tracks to transport people or goods to destinations. Vehicles are able to move to various locations on one or more wheels mounted onto the frame of the vehicle. Such vehicles may be classified into three- or four-wheel vehicles, a two-wheel vehicle such as a motorcycle, construction machinery, bicycles, trains traveling along rails on tracks, and the like. With the development of automotive technology, there are advantages of traveling long distances but problems also often arise as traffic conditions worsen and traffic jams increase where population densities are high.

To relieve burdens and increase convenience of a driver, recent studies regarding vehicles equipped with an Advanced Driver Assist System (ADAS) that actively provides information regarding a state of the vehicle, a state of the driver, and surrounding conditions are actively ongoing. Examples of the ADAS equipped within the vehicle include Rear Cross-Traffic Collision Warning (RCCW) and Rear Cross-Traffic Collision-Avoidance Assist (RCCA). The RCCA is a system that prevents collision by performing brake braking control of the vehicle based on collision determination contents detected by a sensor mounted on the vehicle when a risk of collision is determined by not recognizing the driver's inattention or a cross-approaching vehicle in a blind spot while the vehicle is driving rearward.

In other words, the conventional RCCA prevents collision by braking during risk conditions when another vehicle approaches by recognizing a vehicle cross-approaching from a rear lateral side by a rear lateral side radar sensor. However, when an approach angle of a vehicle approaching from the rear lateral side is substantially parallel to a subject vehicle, collision is unable to be prevented since the subject vehicle is unable to detect the approaching vehicle as a collision risk vehicle.

SUMMARY

An aspect of the present disclosure provides a vehicle capable of performing collision avoidance control under special conditions in which a parked vehicle exits a parking area while driving in parallel with another vehicle approaching in a side lane and preventing erroneous control conditions that may occur during driving of the vehicle, and a method of controlling the vehicle.

Another aspect of the present disclosure provides a vehicle capable of performing the collision avoidance control during a left turn or a U-turn, and a method of controlling the vehicle. Additional aspects of the present disclosure will be set forth in part in the description which follows and, in part, will be obvious from the description, or may be learned by practice of the disclosure.

In accordance with an aspect of the disclosure, a vehicle may include an imager configured to obtain an image of a surrounding object, and output image information about the obtained image; an obstacle detector configured to detect an obstacle, and output obstacle information about the detected obstacle; a driving information detector configured to detect a steering angle, and output steering angle information regarding the detected steering angle; and a controller configured to recognize a road surface marking displayed on a road based on the image information obtained from the imager, in response to determining that the recognized road surface marking is at least one of a U-turn line and a U-turn marking, recognize the obstacle causing collision risk during a U-turn driving based on the image information and the obstacle information, and perform collision avoidance control with the recognized obstacle based on the steering angle information.

The controller may be configured to obtain a driving path of a subject vehicle based on the steering angle information, obtain a position change of the recognized obstacle based on the obstacle information, obtain a path of the obstacle based on the obtained position change of the obstacle, to set a risk of collision region based on the path of the subject vehicle and the path of the obstacle, and adjust at least one of steering or braking based on the set the risk of collision region.

The driving information detector may be configured to detect a driving speed of the subject vehicle, and output driving speed information on the detected driving speed. The controller may be configured to obtain the driving speed information of the recognized obstacle based on the obstacle information, set an expected collision region in the risk of collision region based on the driving speed information of the subject vehicle, the obtained path of the subject vehicle, the path of the obstacle, and the obtained driving speed information of the obstacle, and adjust at least one of the steering or the braking based on the set expected collision region.

The controller may be configured to increase a braking amount of the subject vehicle above a predetermined value within the set expected collision region. The controller may be configured to reduce a timing of outputting information about the risk of collision with the obstacle by a predetermined time within the set expected collision region.

Additionally, the controller may be configured to divide the set the risk of collision region into a plurality of regions, set a first weight in a region corresponding to a field of view of the imager among the divided plurality of regions, set a second weight in a region corresponding to front left and right field of views of the obstacle detector, set a third weight in a region corresponding to a rear view of the obstacle detector, and adjust at least one control amount of the steering or the braking based on weights set in the plurality of regions. The controller may be configured to recognize vehicles driving in an intersection direction based on the image information obtained from the imager, and recognize the vehicle performing a right turn among the recognized vehicles as the obstacle that can collide during a U-turn driving.

The controller may further be configured to, in response to determining that the recognized road surface marking is at least one of a left turn line and a left turn marking, recognize the obstacle that may collide during a left turn driving is recognized based on the image information and the obstacle information, generate a driving path by the left turn driving based on the steering angle information, and perform collision avoidance control with the recognized obstacle based on the generated driving path by the left turn driving. The controller may be configured to recognize opposite vehicles driving in opposite directions based on the image information obtained from the imager, and recognize the vehicle performing a right turn among the recognized opposite vehicles the obstacle causing collision during the left turn driving.

The vehicle may further include at least one of a display configured to display collision avoidance information with the recognized obstacle as an image in response to a control command of the controller; and a sound output device configured to output the collision avoidance information with the recognized obstacle as a sound in response to the control command of the controller. The vehicle may further include an input device configured to receive destination information; and a communicator configured to receive current position information. The controller may be configured to generate navigation information based on the current position information and the destination information, and determine whether to drive U-turn based on the generated navigation information.

In accordance with another aspect of the disclosure, a method of controlling a vehicle may include determining, by a controller, whether a driving intention of a user is a U-turn intention or a left turn intention based on image information obtained by an imager; in response to determining that the driving intention of the user is the U-turn intention or the left turn intention, recognizing, by the controller, an obstacle that may cause a collision during a U-turn driving or a left turn driving based on the image information and obstacle information detected by an obstacle detector; and performing, by the controller, collision avoidance control with the recognized obstacle based on steering angle information of the vehicle.

The determining of whether the driving intention of the user is the U-turn intention or the left turn intention may include recognizing a road surface marking displayed on a road based on the image information; determining whether the recognized road surface marking is at least one of a U-turn line and a U-turn marking; and determining whether the recognized road surface marking is at least one of a left turn line and a left turn marking. The determining of whether the driving intention of the user is the U-turn intention or the left turn intention may further include determining whether an on signal of a left turn indication lamp or an on signal of a left direction indication lever has been received; and determining whether the U-turn intention or the left turn intention of the user based on the steering angle information of the vehicle.

The adjusting of at least one of steering or braking may include obtaining a driving path of the vehicle based on the steering angle information; obtaining a position change of the recognized obstacle based on the obstacle information; obtaining a path of the obstacle based on the obtained position change of the obstacle; setting a risk of collision region based on the path of the vehicle and the path of the obstacle; and adjusting at least one of the steering or the braking based on the set the risk of collision region.

Additionally, the adjusting of at least one of the steering or the braking may include obtaining driving speed information of the recognized obstacle based on the obstacle information; setting an expected collision region in the risk of collision region based on the driving speed information of a subject vehicle, the obtained path of the subject vehicle, the path of the obstacle, and the obtained driving speed information of the obstacle; and adjusting at least one of the steering or the braking based on the set expected collision region. The adjusting of at least one of the steering or the braking may further include increasing a braking amount of the subject vehicle above a predetermined value within the set expected collision region.

The method may further include reducing a timing of outputting information about the risk of collision with the obstacle by a predetermined time within the set expected collision region. The adjusting at least one of the steering or the braking may include dividing the set the risk of collision region into a plurality of regions; setting a first weight in a region corresponding to a field of view of the imager among the divided plurality of regions; setting a second weight in a region corresponding to front left and right field of views of the obstacle detector; setting a third weight in a region corresponding to a rear view of the obstacle detector; and adjusting at least one control amount of the steering or the braking based on weights set in the plurality of regions. The method may further include outputting collision avoidance information with the recognized obstacle as an image or a sound.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
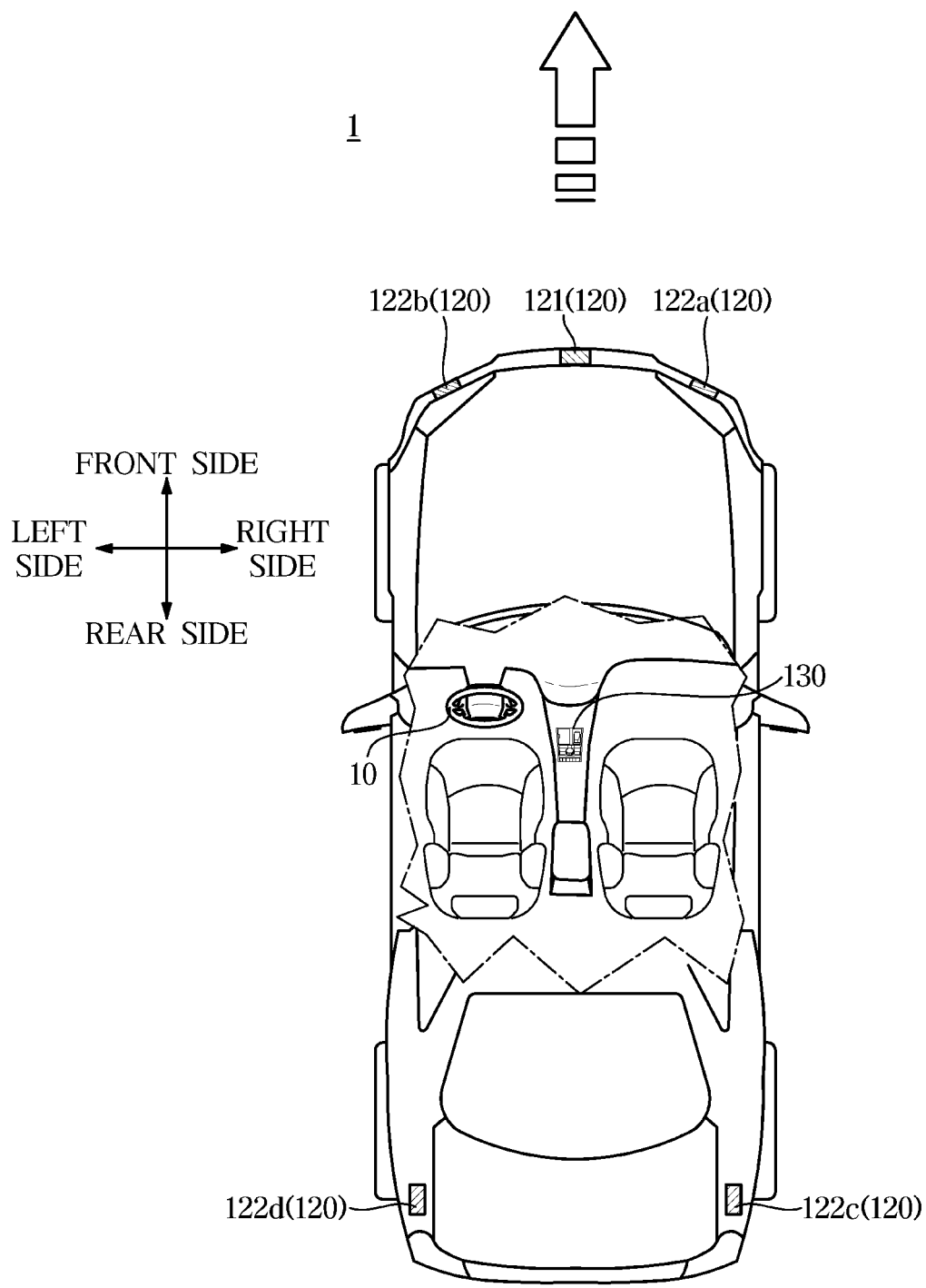
FIG. 1 is a view illustrating a vehicle according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network. It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Reference numerals used for method steps are merely used for convenience of explanation, but not to limit an order of the steps. Thus, unless the context clearly dictates otherwise, the written order may be practiced otherwise.

Figure 2:
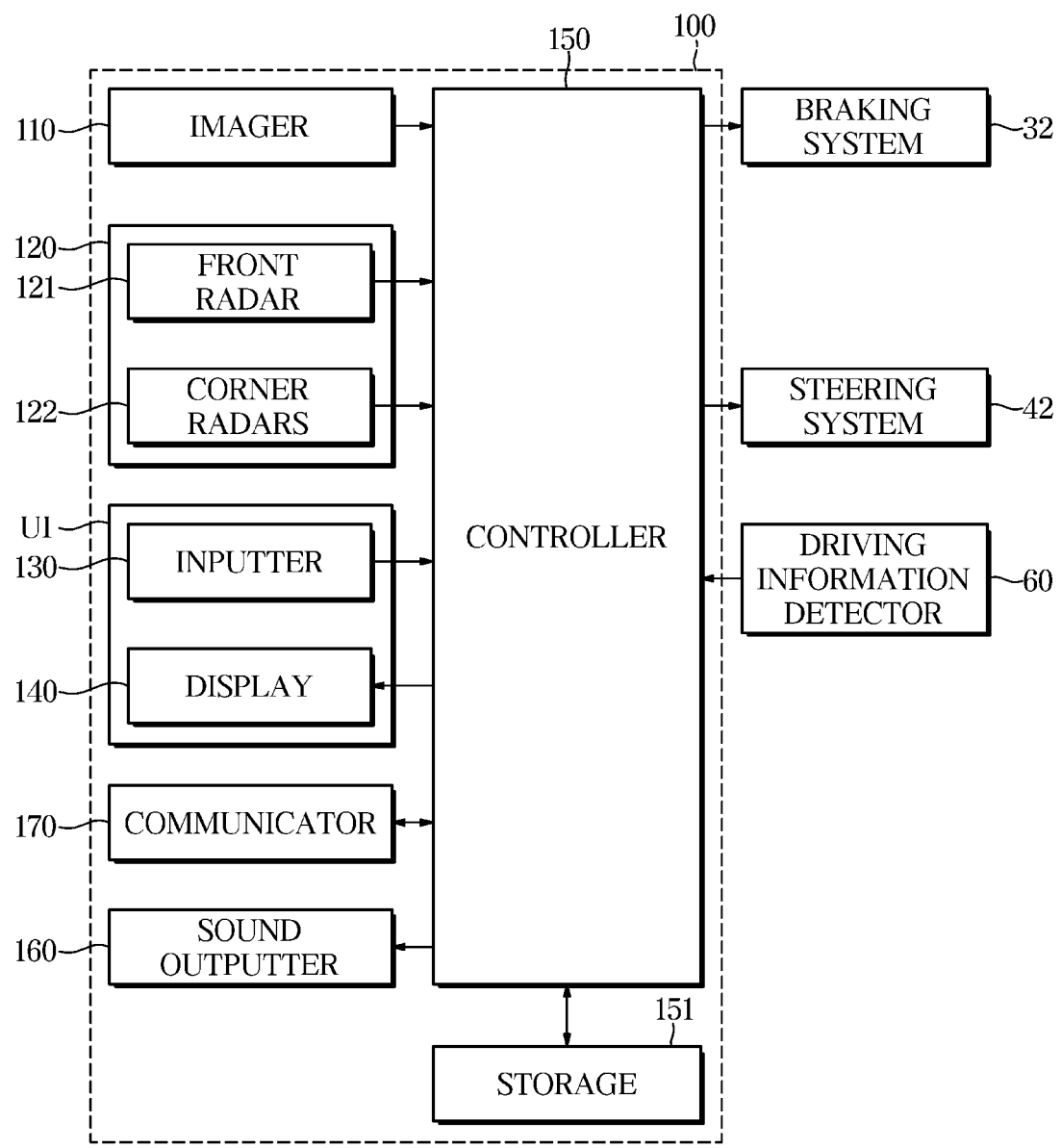
FIG. 2 is a view illustrating a control configuration of a vehicle according to an exemplary embodiment of the disclosure.

Hereinafter, an operation principle and exemplary embodiments of the disclosure will be described with reference to accompanying drawings. FIG. 1 is a view illustrating a vehicle according to an exemplary embodiment of the disclosure, and FIG. 2 is a view illustrating a control configuration of a vehicle according to an exemplary embodiment of the disclosure.

Hereinafter for convenience of description, a direction in which a vehicle 1 drives forward may be defined as the front side, and the left direction and the right direction may be defined with respect to the front side. When the front side is a 12 o'clock direction, a 3 o'clock direction or in the vicinity of the 3 o'clock direction may be defined as the right direction and a 9 o'clock direction or in the vicinity of the 9 o'clock direction may be defined as the left direction. A direction opposite to the front side may be defined as the rear side. A bottom direction with respect to the vehicle 1 may be defined as the lower side and a direction opposite to the lower side may be defined as the upper side. Additionally, a surface disposed on the front side may be defined as a front surface, a surface disposed on the rear side may be defined as a rear surface, and a surface disposed on the lateral side may be defined as a side surface. Furthermore, a side surface in the left direction may be defined as a left surface and a side surface in the right direction may be defined as a right surface.

A steering wheel 10 and an instrument panel may be disposed in front of a driver's seat. The steering wheel 10 may be rotated in a particular direction by manipulation of the driver, and accordingly, front or back wheels of the vehicle 1 may be rotated, thereby steering the vehicle 1. The steering wheel 10 may include a spoke linked to a rotational shaft. On the spoke, there may be an input for receiving various instructions, and the input may be implemented with mechanical buttons, switches, knobs, touch pad, touch screen, stick-type manipulation device, trackball, or the like.

The vehicle 1 may include an advanced driver assistance system (ADAS) 100 that assists in operation (driving, braking, steering) of the vehicle 1. For example, the ADAS 100 may be configured to detect a surrounding environment (e.g., another vehicle, a pedestrian, a cyclist, a lane, a road sign, etc.) around the vehicle 1 and adjust the driving and/or braking and/or steering of the vehicle 1 in response to the sensed surrounding environment. The ADAS 100 may provide the driver with various functions. For example, the ADAS 100 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device configured to output notification information about a collision with an obstacle or avoid the obstacle to prevent the collision with the obstacle. The vehicle 1 of the disclosure may be the vehicle having the collision avoidance device that outputs the notification information about the collision with the obstacle to avoid the collision with the obstacle.

As illustrated in FIG. 2, the vehicle 1 may include an imager 110, an obstacle detector 120, an input device 130, a display 140, a controller 150, a storage 151, a sound output device 160, and a communicator 170. The controller 150 may be configured to operate the other components of the vehicle 1. The imager 110 is an imaging device configured to obtain or capture image data of an object around the vehicle 1 (e.g., subject vehicle), that is, image data of a road. The imager 110 may be configured to capture the front of the vehicle 1 and detect other vehicles, pedestrians, cyclists, lanes, road signs, and the like.

The imager 110 may include one or a plurality of cameras. The plurality of cameras may be configured to obtain images of roads in different directions. For example, the plurality of cameras may include a front camera configured to obtain the image of the road in front of the vehicle, and a rear camera configured to obtain the image of the road at the rear side of the vehicle. The front camera may be disposed on a window glass of the front of the vehicle 1, but may be disposed on a window glass inside the vehicle 1, or may be disposed on a front panel, a room mirror inside the vehicle 1, or a roof panel to be exposed to the exterior. The front camera may be also disposed on a license plate, a grille, or an emblem of the front of the vehicle 1. A field of view of the front camera disposed on the roof panel may be the front side of the vehicle 1.

The rear camera may be disposed on a window glass at the rear of the vehicle, but may be disposed on the window glass inside the vehicle, or may be disposed on a rear panel, tail gate, a license plate at the rear of the vehicle 1, or the emblem or roof panel at the rear of the vehicle 1 to be exposed to the exterior. A field of view of the rear camera provided on the roof panel may be the rear side of the vehicle 1. The rear camera may be a camera for parking assistance, a camera of a surround view monitor (SVM or AVM), a camera of a blind spot detection ((BSD), or a camera of a rear side detection device.

The imager 110 may further include a camera disposed on the left and right side mirrors to obtain images of roads on the left and right lateral sides and rear side of the vehicle 1. The imager 110 may include a charge-coupled device (CCD) or a complimentary metal-oxide semiconductor (CMOS) image sensor and may include a 3D spatial recognition sensor such as a KINECT (RGB-D Sensor), a TOF (Structured Light Sensor), a stereo camera, and the like. The imager 110 may be a camera for lane departure warning, a camera for autonomous driving control, a camera for a black box, or a camera for detecting the obstacle.

The imager 110 may be configured to image the front of the vehicle 1 and obtain image data regarding the front of the vehicle 1. The imager 110 may have a field of sensing directed to the front of the vehicle 1. The imager 110 may include a plurality of lenses and an image sensor. The image sensor may include a plurality of photodiodes for converting light into electrical signals, and the plurality of photodiodes may be arranged in a two-dimensional matrix.

The obstacle detector 120 may be configured to obtain obstacle data around the vehicle 1. The obstacle detector 120 may include a front radar 121 and a plurality of corner radars 122 (122a, 122b, 122c, 122d). The obstacle detector 120 may further include at least one of a light detection and ranging (Lidar) sensor and an ultrasonic sensor. The front radar 121 may have the field of sensing directed to the front of the vehicle 1. The front radar 121 may be installed, for example, on the grille or a bumper of the vehicle 1.

The plurality of corner radars 122 may include a first corner radar 122a installed on the front right side of the vehicle 1, a second corner radar 122b installed on the front left side of the vehicle 1, a third corner radar 122c installed on the rear right side of the vehicle 1, and a fourth corner radar 133d installed on the rear left side of the vehicle 1. The first, second, third, and fourth corner radars 122a, 122b, 122c and 122d may be configured to obtain first corner radar data, second corner radar data, third corner radar data, and fourth corner radar data, respectively.

The first corner radar data may include distance information and speed information regarding another vehicle (e.g., a second vehicle), a pedestrian or a cyclist (hereinafter, referred to as the obstacle) present at the front right side of the vehicle 1. The second corner radar data may include distance information and speed information regarding the obstacle present at the front left side of the vehicle 1. The third and fourth corner radar data may respectively include distance and speed information regarding the obstacle present at the rear right side of the vehicle 1 and distance and speed information regarding an object located at the rear left side of the vehicle 1, respectively.

The input device 130 may be configured to receive a user command. The input device 130 may be configured to receive operation commands for various functions that may be performed in the vehicle 1 as the user command. In addition, the input device 130 may be configured to receive the operation command in a collision avoidance mode. The input device 130 may be configured to receive the operation command of at least one of a navigation mode and a map display mode. The input device 130 may be configured to receive destination information when performing the navigation mode.

Further, the input device 130 may be provided on a head unit, a center fascia, and the steering wheel 10, and may include at least one physical button such as an operation on/off button for various functions, a button for changing setting values of various functions, etc. The input device 130 may further include a jog dial or a touch pad for inputting a movement command and a selection command of a cursor displayed on the display 140.

The display 140 may be configured to display information about the function being performed in the vehicle 1 and information input by the user. The display 140 may be configured to display information on an audio function, a video function, a navigation function, a DMB function, and a radio function. In addition, the display 140 may be configured to display the notification information for collision avoidance. The display 140 may be configured to display a map image within a predetermined range from a current position of the vehicle 1 in the map display mode, display map information matching path information from the current position to a destination in the navigation mode, and display path guidance information.

The input device 130 and the display 140 may be user interfaces (UI). The display 140 may include a display panel, and the input device may include a touch panel. In other words, a touch screen in which the touch panel is integrated on the display panel may be provided. The display 140 may include a cluster. The cluster may also be configured to display the notification information for collision avoidance. The cluster may also be configured to display information about driving intention operated by the user. In particular, the information about the driving intention may include information regarding a left turn intention, a U-turn intention, and a right turn intention. The display 140 may be provided on the head unit or a vehicle terminal.

The controller 150 may be configured to operate the display 140 and the sound output device 160 to generate a path from the current position to the destination based on the current position information and the destination information received by a position receiver when performing the navigation mode and output the generated path and the path guidance information. The controller 150 may be configured to generate navigation information by matching the generated path information and the current position information with the map information and operate the display 140 to display the generated navigation information.

The controller 150 may be configured to process the front image data of the imager 110, the front radar data of the front radar 121, and the corner radar data of the plurality of corner radars 122, and generate a brake signal and a steering signal for operating a braking system 32 and a steering system 42. More particularly, the controller 150 may be configured to recognize or detect obstacles in front of the vehicle 1 based on the front image data of the imager 110 and the front radar data of the front radar 121, and obtain position information (direction) and type information (e.g., whether the obstacle is another vehicle, a pedestrian, a cyclist, a curb, a guard rail, a roadside tree, a street lamp, or the like) of the recognized obstacles.

The controller 150 may be configured to match the obstacles detected by the front image data with the obstacles detected by the front radar data, and obtain the type information, the position information, and the speed information of the obstacles in front of the vehicle 1 based on a result of the matching. The controller 150 may be configured to obtain position information (e.g., distance and direction) and speed information (relative speed) of the obstacles in front of the vehicle 1 based on the front radar data of the front radar 121.

The controller 150 may be configured to recognize obstacles on the lateral side and the rear side of the vehicle 1 based on the corner radar data of the plurality of corner radars 122*a*, 122*b*, 122*c*, and 122*d*, and obtain position information (direction) and type information (e.g., whether the obstacle is another vehicle, the pedestrian, the cyclist, the curb, the guard rail, the roadside tree, the street lamp, or the like) of the recognized obstacles. In other words, the controller 150 may be configured to obtain the position information and the speed information of the obstacle from obstacle information detected by the obstacle detector 120, obtain the relative distance between the vehicle 1 and the obstacle and the relative speed between the vehicle 1 and the obstacle based on the acquired position information and speed information of the obstacle, and a time to collision (TTC) between the vehicle 1 and the obstacle based on the relative distance and the relative speed.

Additionally, the controller 150 may be configured to warn the driver (e.g., output a warning notification to the driver) of the collision or perform a brake control and a steering control to avoid the obstacle based on the TTC. The controller 150 may also be configured to obtain a distance to collision (DTC) based on the speed information (i.e., relative speed) of front obstacles. The controller 150 may be configured to warn the driver of the collision or perform the brake control and the steering control to avoid the obstacle based on a result of comparison between the distance to the collision and the distance to the front obstacles. The controller 150 may be configured to obtain coordinate information that changes as the obstacle moves from the obstacle information detected by the obstacle detector 120 in real time, and obtain distance information between the vehicle 1 and the obstacle.

Additionally, the controller 150 may be configured to recognize another vehicle (e.g., a second vehicle or an approaching vehicle) approaching from the rear side and the lateral side of the vehicle 1 based on the obstacle information detected by the obstacle detector 120. When the vehicle 1 is in a parking state, the controller 150 may be configured to recognize another vehicle parked in the rear or front of the vehicle 1 based on at least one of the obstacle information detected by the obstacle detector 120 and the image information obtained by the imager 110. The controller 150 may be configured to recognize a shape of the road around the vehicle 1, the lane displayed on the road, and a road surface marking from the image information. In other words, the controller 150 may be configured to recognize the lane or a parking line marking displayed on the road, and recognize the lane of the road on which the vehicle 1 is driving or a parking area where the vehicle 1 is parked based on the position information of the recognized lane.

Figure 3A:
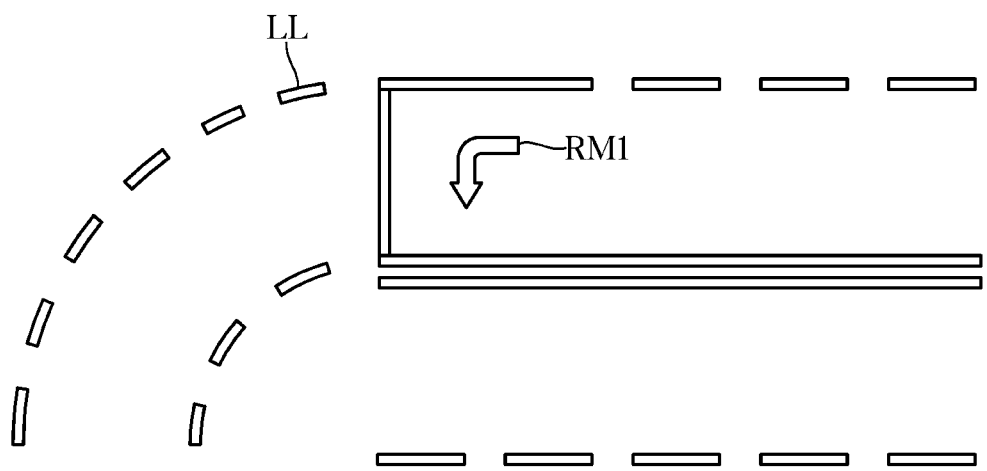
FIGS. 3A, 3B, and 3C are a view illustrating a road surface marking recognized by a vehicle according to an exemplary embodiment of the disclosure.
Figure 3B:
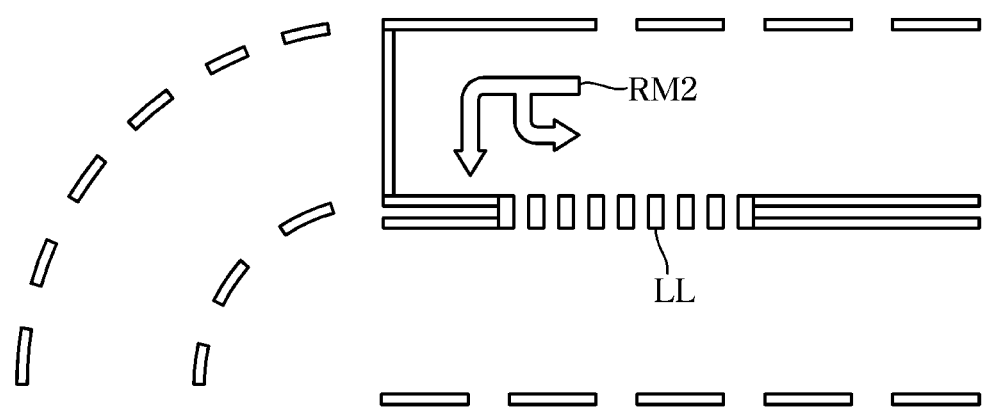
Figure 3C:
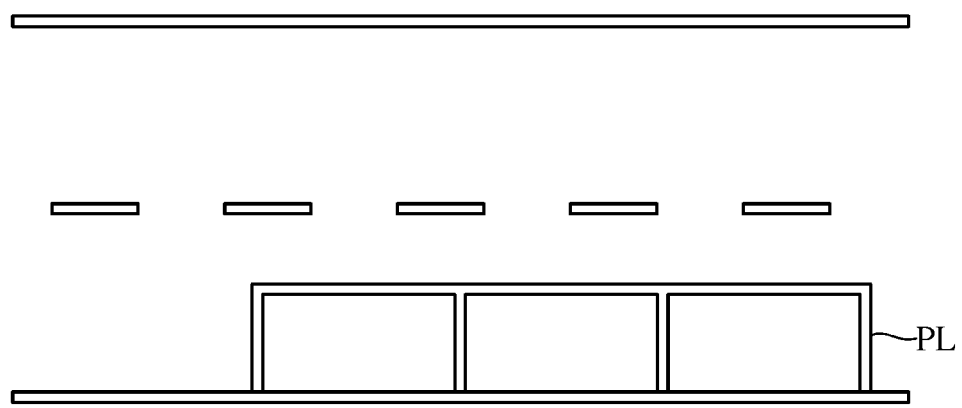

As illustrated in FIGS. 3A, 3B, and 3C, the road surface marking indicates regulations and instructions for lanes and road traffic, and may include a left turn marking RM1, a U-turn marking RM2, and a parking line marking PL. The road surface marking may include a straight marking, a right turn marking, a straight forward/left turn simultaneous marking, a straight forward/right turn simultaneous marking, a left turn/U-turn simultaneous marking, a left turn prohibition marking, a right turn prohibition marking, a straight forward prohibition marking, and a U-turn prohibition marking. The lane may include a center line, a solid line, a dotted line, a U-turn line UL, a dedicated bus line, and a left turn line LL.

The controller 150 may be configured to determine whether the vehicle 1 is in the parking state based on driving information detected by a driving information detector 60 and the image information obtained from the imager 110. In response to determining that the vehicle 1 is in the parking state, the controller 150 may be configured to determine the driver's intention is an exit intention based on at least one of the driving information detected by the driving information detector 60, operation information of the steering wheel 10, engagement information of a brake pedal, and engagement information of an accelerator pedal.

The controller 150 may be configured to determine whether the vehicle 1 is in the parking state, and determine whether the driving intention of the user is the exit intention, based on at least one of position information of a shift lever, driving speed information, and an on/off signal of an electronic parking brake. The controller 150 may be configured to determine whether the parking line marking PL is present based on the image information. In response to determining that the parking line marking PL is present, the controller 150 may be configured to determine that the vehicle 1 is in the parking state.

When the user's intention is the exit intention, the controller 150 may generate a driving path of a subject vehicle based on steering angle information of the vehicle 1 detected by the driving information detector 60, and set a risk of collision region of the vehicle 1 based on the generated driving path of the subject vehicle and the driving path of another vehicle (that is, a first vehicle) driving on a rear lateral side of the vehicle 1. When the vehicle 1 is in the parking state, the controller 150 may be configured to determine whether another vehicle (that is, a second vehicle) is present at least one of the front and rear sides of the vehicle 1 based on the obstacle information detected by the obstacle detector 120. In response to determining that whether there is the second vehicle in a left lateral side and a right lateral side relative to the subject vehicle, the controller 150 may be configured to set the risk of collision region of the vehicle 1 based on the position information of the second vehicle.

When performing an exit driving, the controller 150 may be configured to set different weights for each of the region corresponding to the field of view of the imager 110 and the region corresponding to the field of view of the obstacle detector 120 among the risk of collision regions. In other words, when performing the exit driving, the controller 150 may be configured to divide the risk of collision region into a plurality of regions and set weights for each of the divided plurality of regions. The controller 150 may be configured to divide the risk of collision region into a plurality of regions during the exit driving while the parking line marking PL is recognized. When setting weights for the divided plurality of regions, the controller 150 may be configured to preferentially set the weight for the region corresponding to the field of view of the image 110 among the plurality of regions over the remaining regions.

The controller 150 may be configured to divide the risk of collision region into the plurality of regions during the exit driving while the parking line marking PL is not recognized. When setting the weights for the divided regions, the controller 150 may be configured to preferentially set the weight for the region corresponding to the field of view of the plurality of corner radars 122 among the plurality of regions over the remaining regions. When performing the exit driving, the controller 150 may be configured to set an expected collision region within the risk of collision region based on the driving information of the vehicle 1 and driving information of the first vehicle 2.

The driving information of the vehicle 1 may include information about an expected path and a driving speed of the vehicle 1. The driving information of the first vehicle 2 may include information about an expected driving path and the driving speed of the first vehicle 2. In other words, the controller 150 may be configured to obtain a change in the real-time position of the first vehicle 2 based on the obstacle information detected by the obstacle detector 120, and obtain information about the expected driving path and the driving speed of the first vehicle 2 based on the obtained change in the real-time position.

The controller 150 may then be configured to change the driving control amount, such as steering or the driving speed of the vehicle 1, based on at least one of the set expected collision region and the risk of collision region, and operate at least one of the display 140 and the sound output device 160 to output driving guidance information or warning information for collision avoidance. The controller 150 may be configured to recognize whether the driving intention of the user is the left turn intention or the U-turn intention based on the image information obtained by the imager 110 while driving and the driving information detected by the driving information detector 60.

The controller 150 may be configured to determine the left turn intention based on an on signal of a left turn indication lamp or an on signal of a left direction indication lever. The controller 150 may be configured to determine whether the road surface marking displayed on the road is one of the left turn marking RM1, the U-turn marking RM2, and the left turn/U-turn simultaneous marking based on the image information obtained from the imager 110. In response to determining that the road surface marking is one of the left turn marking RM1, the U-turn marking RM2, and the left turn/U-turn simultaneous marking, the controller 150 may be configured to recognize whether the driving intention of the user is the left turn intention or the U-turn intention based on the recognized road surface marking information.

Additionally, in response to determining that the lane displayed on the road is the U-turn line UL based on the image information obtained from the imager 110, the controller 150 may be configured to determine that the driving intention of the user is the U-turn intention. In response to determining that the lane displayed on the road is the left turn line based on the image information obtained from the imager 110, the controller 150 may be configured to determine that the driving intention of the user is the left turn intention determine The controller 150 may be configured to determine whether the driving intention of the user is the left turn intention or the U-turn intention based on a steering angle when the lanes displayed on the road are the U-turn line UL and the left turn line LL based on the image information obtained from the imager 110. The controller 150 may further be configured to determine whether the driving intention of the user is the left turn intention or the U-turn intention based on the steering angle information among the driving information detected by the driving information detector 60, and determine the left turn intention or the U-turn intention based on the navigation information.

In response to determining that the driving intention of the user is the U-turn intention or the left turn intention, the controller 150 may be configured to set the risk of collision region of the vehicle 1 based on the steering angle information of the vehicle 1 detected by the driving information detector 60, the driving speed information of the vehicle 1, and the driving path of another vehicle (e.g., a third vehicle) driving in the front lateral side of the vehicle 1.

When performing a U-turn driving or a left turn driving, the controller 150 may be configured to set different weights for each of the region corresponding to the field of view of the imager 110 and the region corresponding to the field of view of the obstacle detector 120 among the risk of collision regions. In other words, when performing the U-turn driving or the left turn driving, the controller 150 may be configured to divide the risk of collision region into the plurality of regions and set the weights for each of the divided plurality of regions. When performing the U-turn driving or the left turn driving, the controller 150 may be configured to set the expected collision region in the risk of collision region based on the driving information of the vehicle 1 and the driving information of the third vehicle 5.

The driving information of the third vehicle 5 may include information about an expected driving path and the driving speed of the third vehicle 5. In other words, the controller 150 may be configured to obtain a change in the real-time position of the third vehicle 5 based on the image information obtained by the image 110 and the obstacle information detected by the obstacle detector 120, and obtain information about the expected driving path and the driving speed of the third vehicle 5 based on the obtained change in the real-time position.

When performing the U-turn driving or the left turn driving, the controller 150 may be configured to change the driving control amount, such as steering or the driving speed of the vehicle 1, based on at least one of the set expected collision region and the risk of collision region, and control the operation of at least one of the display 140 and the sound output device 160 to output the driving guidance information or the warning information for the collision avoidance. The driving guidance information may include optimal driving path information.

The controller 150 may be implemented with a memory configured to store an algorithm to execute operation of the components in the ADAS or the vehicle 1 or data about a program that implements the algorithm, and a processor configured to perform the aforementioned operation using the data stored in the memory. The memory and the processor may be implemented in separate chips. Alternatively, the memory and the processor may be implemented in a single chip.

The storage 151 may be configured to store various data related to the control of the vehicle 1. Particularly, according to the exemplary embodiment, the storage 151 or memory may store information related to the driving speed, a driving distance, and a driving time of the vehicle 1, and further store the type and position information of the obstacle detected by the imager 110 within the controller. Further, the storage 151 may be configured to store the position information and the speed information of the obstacle detected by the obstacle detector 120 and store coordinates information of the moving obstacle changed in real time. The storage 151 may be configured to store information related to the relative distance and the relative speed between the vehicle 1 and the obstacle. The storage 151 may also be configured to store the braking amount for adjusting the driving speed of the vehicle 1 based on the TTC between the vehicle 1 and the obstacle and store data related to a warning time and the like for providing a warning of the risk of collision to the driver of the vehicle 1.

In addition, the storage 151 may be configured to store data related to equations and control algorithms for operating the vehicle 1. The storage 151 may also be configured to store information regarding a steering-based avoidance path established for the vehicle 1 to avoid the collision with the obstacle located in front of the vehicle 1 and information regarding the rotation angle of the steering wheel obtained by a steering angle detector.

The storage 151 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto. The storage 151 may be a memory that is implemented by a separate memory chip from the aforementioned processor related to the controller 150 or the storage may be implemented by a single chip with a processor.

The sound output device 160 may be configured to output the navigation information as a sound in response to the control command of the controller 150. The sound output device 160 may be configured to output information about the risk of collision with another vehicle as the sound. In particular, the sound may include a warning sound. The sound output device 160 may include at least one speaker provided in the vehicle 1. The communicator 170 may include a position receiver configured to receive the position information of the vehicle 1 and transmit the received position information to the controller 150.

In particular, the position receiver may include a Global Positioning System (GPS) receiver configured to calculate the position of the vehicle 1 by performing communication with a plurality of satellites. The position receiver may include a GPS signal receiver and a signal processor for processing GPS signals obtained by the GPS signal receiver. The GPS signal receiver may include an antenna for receiving signals of a plurality of GPS satellites. The antenna may be mounted the exterior of the vehicle 1.

The signal processor of the position receiver may include software for obtaining the current position using distance and time information corresponding to the position signals of the plurality of GPS satellites and the output device configured to output the obtained position information of the vehicle 1. The driving information detector 60 may be configured to detect driving information of the vehicle 1. In particular, the driving information of the vehicle 1 may be information regarding the driving speed, the driving direction, and the driving distance of the vehicle 1.

The driving information detector 60 may include a speed detector configured to detect the driving speed of a vehicle 1. The speed detector may include a plurality of wheel speed sensors each provided on a plurality of wheels of the vehicle 1, and may include an acceleration sensor configured to detect acceleration of the vehicle 1. The driving information detector 60 may further include the steering angle detector configured to detect an angle of the steering wheel 10. The vehicle 1 may further include a speed adjuster configured to adjust the driving speed of the vehicle 1 based on the driving intention of the user. In particular, the speed adjuster may include the braking system 32 for deceleration and braking, and further include a power device such as an engine or a motor for acceleration.

Figure 4A:
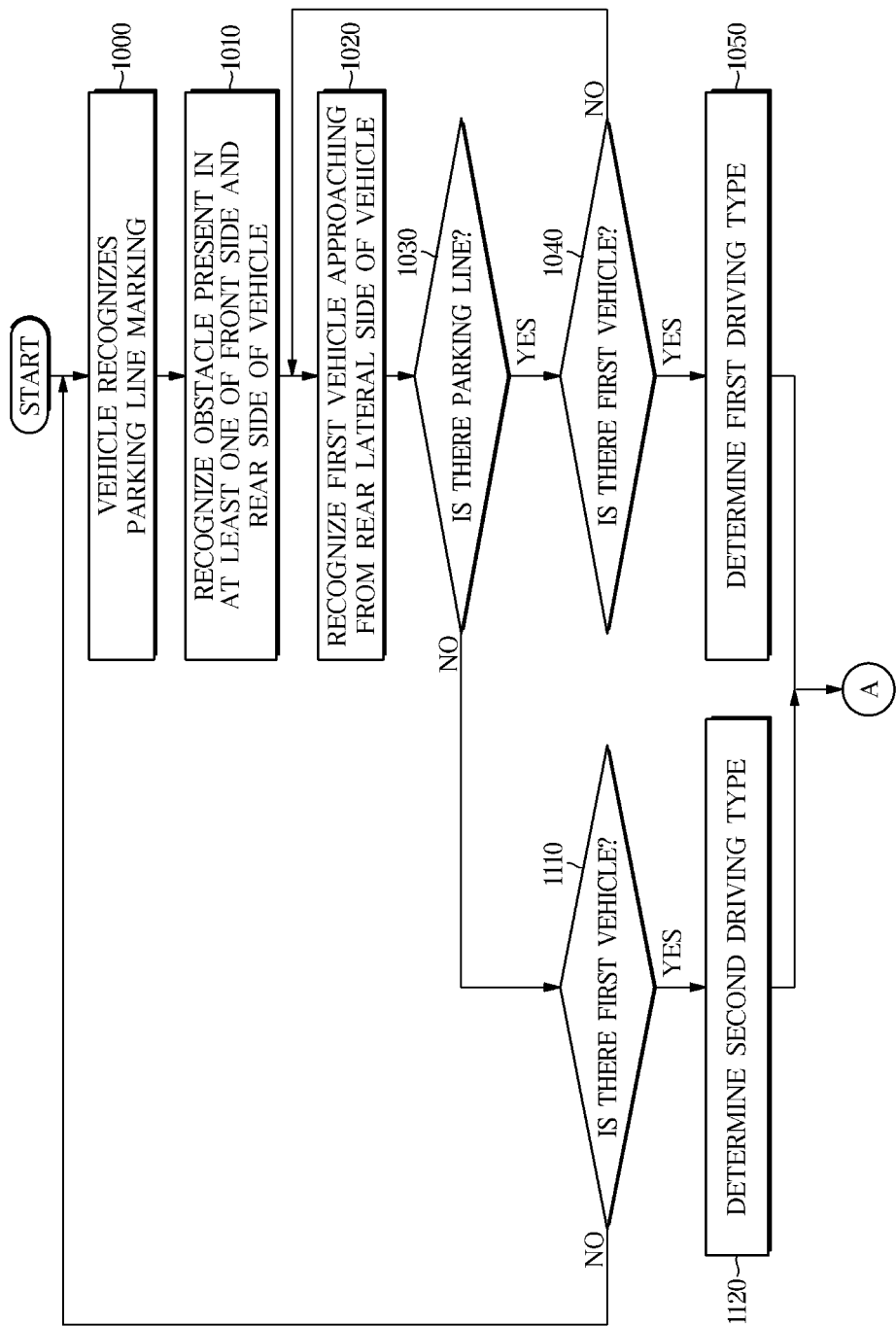
FIGS. 4A, and 4B are a flowchart illustrating a control flow when a vehicle is driving for departure according to an exemplary embodiment of the disclosure.
Figure 4B:
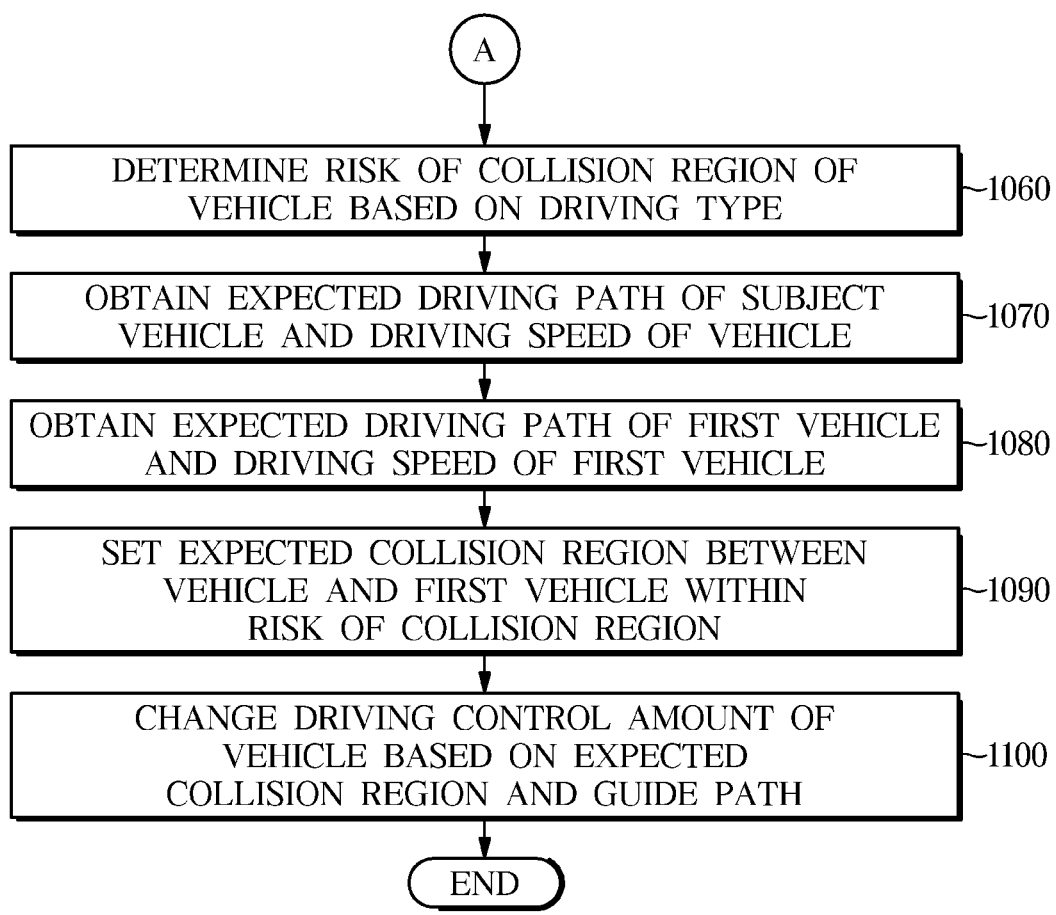

FIGS. 4A, and 4B are a flowchart illustrating a vehicle control according to an exemplary embodiment, and is a flowchart illustrating a control flow when the exit driving is performed in the parking state. This will be described with reference to FIGS. 5 to 11.

Figure 5:
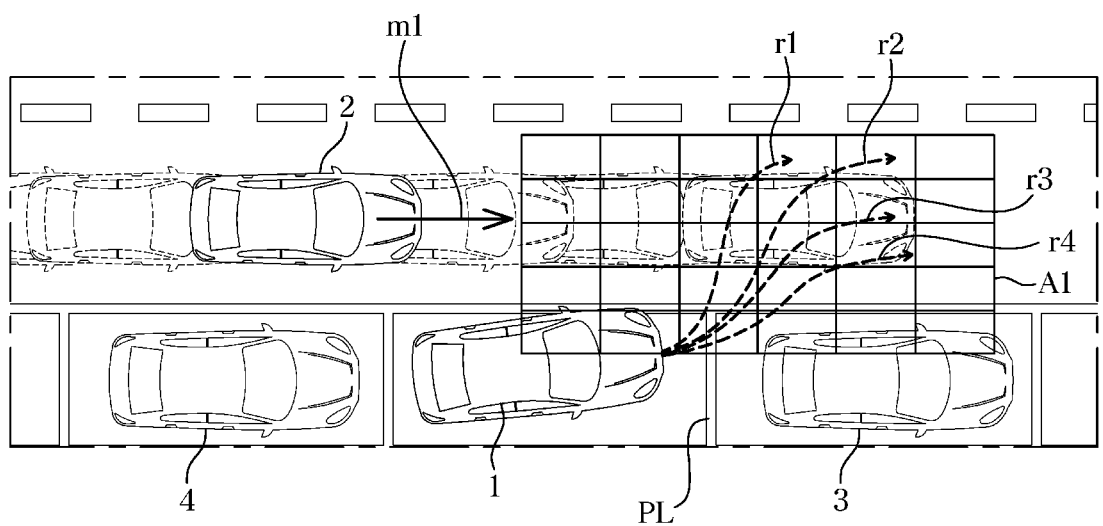
FIG. 5 is a view illustrating setting a risk of collision region of a vehicle when the vehicle is driving out of a parking line according to an exemplary embodiment of the disclosure.
Figure 6:
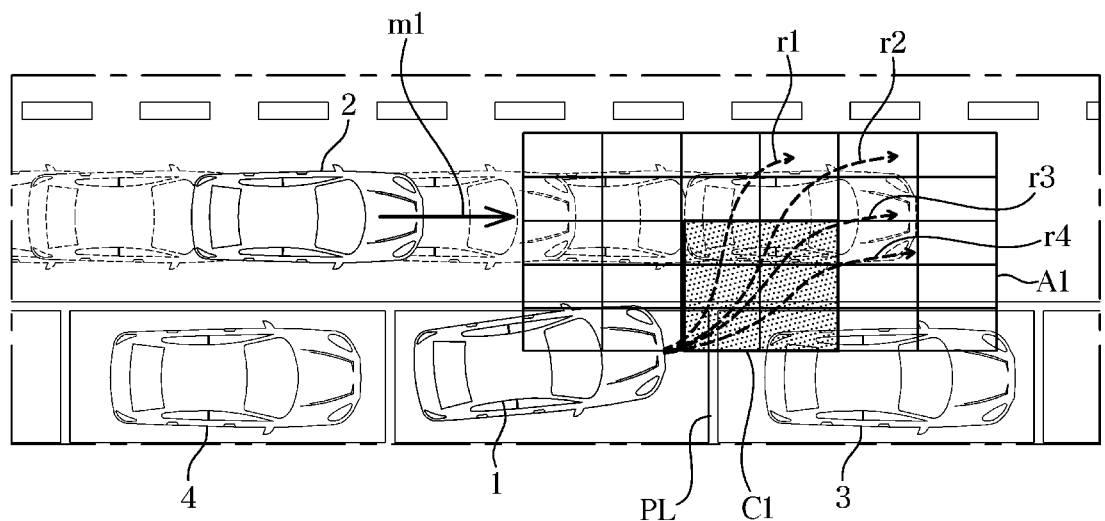
FIG. 6 is a view illustrating setting an expected collision region between a vehicle and a target vehicle within the risk of collision region of FIG. 5 according to an exemplary embodiment of the disclosure.
Figure 7:
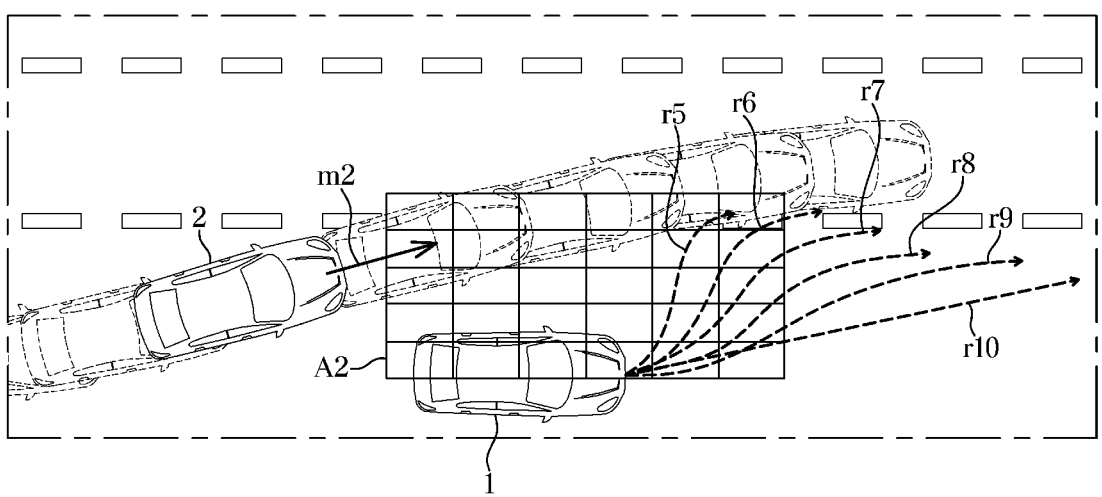
FIG. 7 is a view illustrating setting a risk of collision region of a vehicle when a non-parked vehicle is driving according to an exemplary embodiment of the disclosure.
Figure 8:
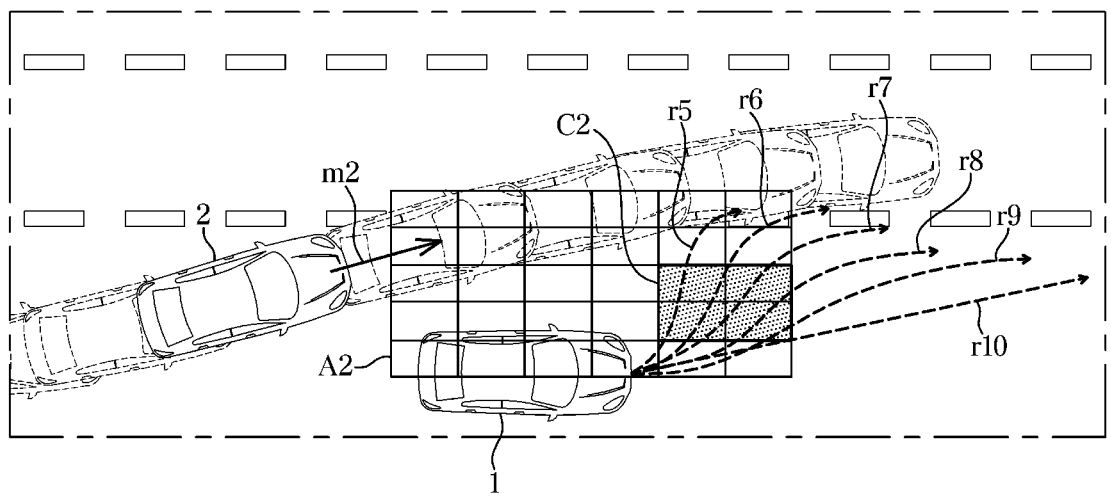
FIG. 8 is a view illustrating setting an expected collision region between a vehicle and a target vehicle within the risk of collision region of FIG. 7 according to an exemplary embodiment of the disclosure.
Figure 9:
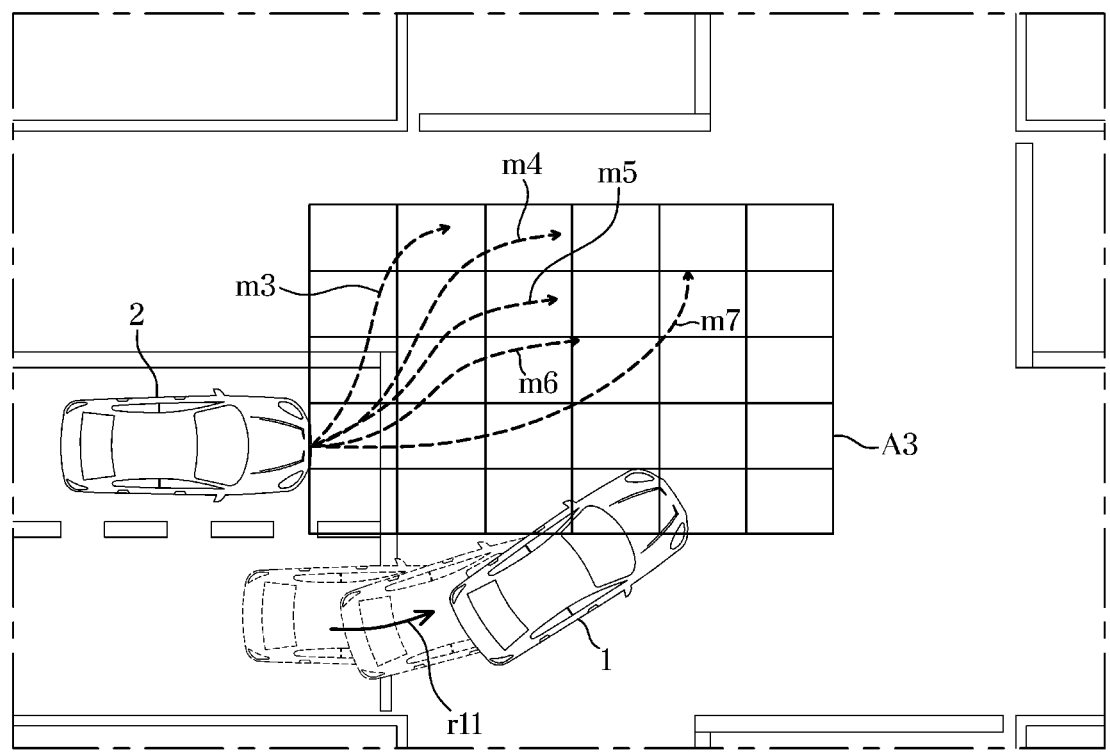
FIG. 9 is a view illustrating setting a risk of collision region of a vehicle when the vehicle makes a left turn or a U-turn according to an exemplary embodiment of the disclosure.
Figure 10:
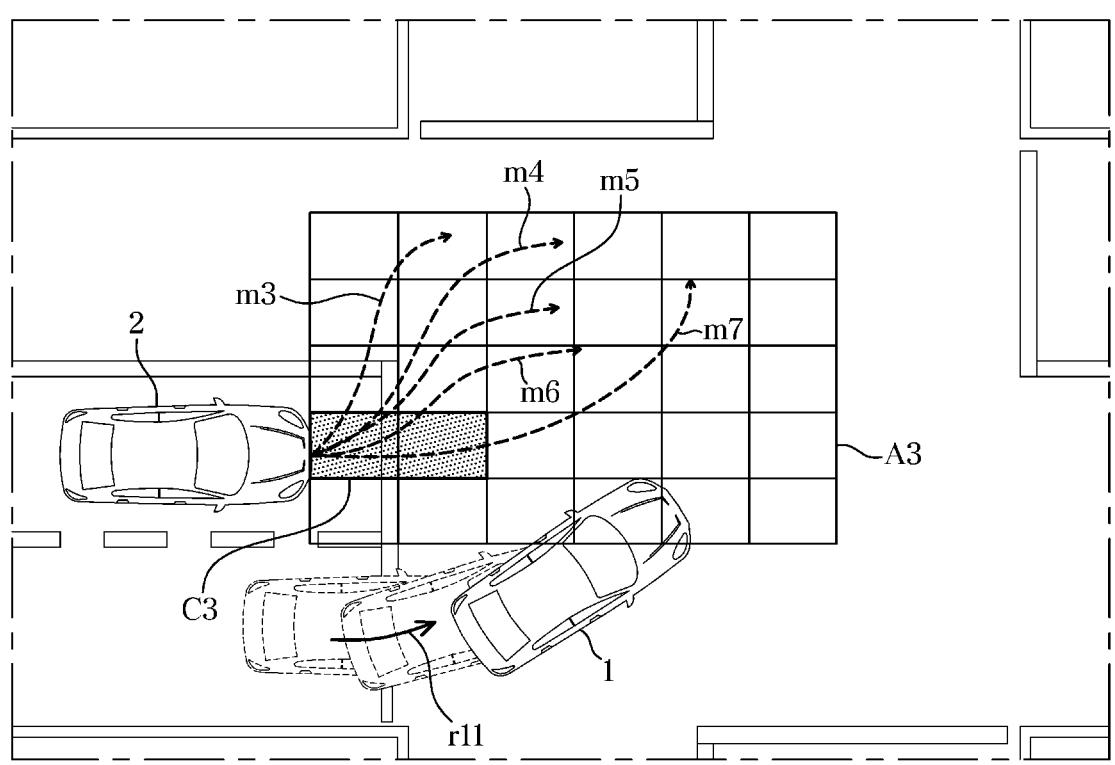
FIG. 10 is a view illustrating setting an expected collision region between a vehicle and a target vehicle within the risk of collision region of FIG. 9 according to an exemplary embodiment of the disclosure.

FIG. 5 is a view illustrating setting a risk of collision region of a vehicle when the vehicle is driving out of a parking line according to an exemplary embodiment of the disclosure, and FIG. 6 is a view illustrating setting an expected collision region between a vehicle and a target vehicle within the risk of collision region of FIG. 5 according to an exemplary embodiment of the disclosure. FIG. 7 is a view illustrating setting a risk of collision region of a vehicle when a non-parked vehicle is driving according to an exemplary embodiment of the disclosure, and FIG. 8 is a view illustrating setting an expected collision region between a vehicle and a target vehicle within the risk of collision region of FIG. 7 according to an exemplary embodiment of the disclosure. FIG. 9 is a view illustrating setting a risk of collision region of a vehicle when the vehicle makes a left turn or a U-turn according to an exemplary embodiment of the disclosure, and FIG. 10 is a view illustrating setting an expected collision region between a vehicle and a target vehicle within the risk of collision region of FIG. 9 according to an exemplary embodiment of the disclosure.

The vehicle 1 may be configured to determine whether the vehicle 1 is in the parking state based on at least one of the position information of the shift lever, the driving speed information, and the on/off signal of the electronic parking brake. In response to the vehicle 1 determining that the vehicle 1 is in the parking state, the vehicle 1 may be configured to recognize the parking line marking PL based on the image information obtained by the imager 110 (1000).

In addition, the vehicle 1 may be configured to recognize the obstacle present in at least one of the front side and the rear side of the vehicle 1 based on the obstacle information detected by the obstacle detector 120 (1010), and recognize another vehicle 2 (e.g., the first vehicle) driving in the rear lateral side of the vehicle 1 (1020). In particular, the obstacle around the vehicle 1 may be the obstacles that are unable to be moved or may be the movable obstacle. The obstacles that are unable to be moved may be the roadside tree and the street lamp, and the obstacles that may be moved may be the pedestrians, the cyclists, another vehicle driving (i.e., the first vehicle) and another vehicle being parked (i.e., the second vehicle). The vehicle 1 may be configured to determine a driving type of the vehicle 1 based on the recognition of the parking line marking PL and the presence of other vehicles.

As illustrated in FIGS. 5 and 6, in response to determining that the parking line marking PL is recognized and at least one of the first vehicle 2 and the second vehicles 3 and 4 around the vehicle 1 is present, the vehicle 1 may be configured to determine the driving type of the vehicle 1 as a first driving type in which the vehicle 1 was parked in the parking line making PL and then exits out of the parking line marking PL. In other words, as illustrated in FIG. 5, there is the risk of collision with the first vehicle 2 driving in the driving lane when the vehicle 1 parked in the parking line marking PL avoids the second vehicle 3 parked on the front side and enters a driving lane out of the parking area.

In order to prevent this, the vehicle 1 may be configured to set a risk of collision region A1 of the vehicle 1 and the second vehicle 2 based on the first driving type for the first vehicle 2 driving in the driving lane in a state substantially parallel to a departure angle of the vehicle 1 (1060). In particular, the vehicle 1 may be configured to set the risk of collision region A1 of the vehicle 1 based on the steering angle of the vehicle 1 and a driving path m1 of the first vehicle 2 approaching from the rear lateral side of the vehicle 1.

Particularly, the steering angle of the vehicle 1 may be greater when the vehicle 1 avoids the second vehicle 3 parked in front and leaves the parking area than when there is no second vehicle 3 parked in front. In addition, the driving path of the first vehicle 2 may be determined according to the presence or absence of the second vehicle 4 parked behind the vehicle 1. This is because the first vehicle 2 may be configured to generate the driving path m1 by avoiding the second vehicle 4.

The vehicle 1 may be configured to determine the risk of collision region A1 between the vehicle 1 and the second vehicle 2 based on the driving path of the vehicle 1 according to the steering angle of the vehicle 1 and the driving speed of the second vehicle 2 detected by the rear lateral side sensor 201. In other words, the vehicle 1 may be configured to determine the risk of collision region A1 between the vehicle 1 and the second vehicle 2 according to the TTC obtained based on an exit direction of the vehicle 1 that has parked and the driving speed of the second vehicle 2 approaching from the rear lateral side. In addition, the vehicle 1 may be configured to divide the risk of collision region into the plurality of regions, and set the different weights for the region corresponding to the field of view of the imager 110 and the region corresponding to the field of view of the obstacle detector 120 among the divided plurality of regions.

Referring to FIG. 6, the vehicle 1 may be configured to set an expected collision region C1 between the vehicle 1 and the first vehicle 2 within the risk of collision region A1 based on the driving information of the vehicle 1 and the driving information of the first vehicle 2. Particularly, the driving information of the vehicle 1 may include information regarding the expected driving path of the vehicle 1 and the driving speed of the vehicle 1. The vehicle 1 may be configured to obtain data regarding the expected driving path of the vehicle 1 based on steering angle data of the steering wheel 10 detected by the steering angle detector of the vehicle 1, and the controller 150 may be configured to operate the speed detector to obtain the driving speed data of the vehicle 1 in real time (1070).

In other words, as illustrated in FIG. 6, the expected driving path of the vehicle 1 may be set as r1, r2, r3 and r4 according to the change in the steering angle. In particular, the expected driving path of the vehicle 1 may vary according to the driving speed of the vehicle 1. The driving information of the first vehicle 2 may include information regarding the expected driving path of the first vehicle 2 and the driving speed of the first vehicle 2.

The vehicle may be configured to obtain the change in the real-time position of the first vehicle 2 based on the obstacle information detected by the obstacle detector 120, and obtain the expected driving path of the first vehicle 2 and the driving speed information of the first vehicle 2 based on the obtained change in the real-time position of the first vehicle 2 (1080). The vehicle 1 may be configured to set the expected collision region C2 between the vehicle 1 and the first vehicle 2 within the risk of collision region A2 based on the obtained driving information of the vehicle 1 and the driving information of the first vehicle 2 (1090).

In other words, the vehicle 1 may be configured to set the risk of collision region A1 of the vehicle 1 based on the parking line marking PL, the position information of at least one first vehicle 2 of the front side and the rear side of the vehicle 1, and the driving path information of the first vehicle 2, and may set the expected collision region C1 in the risk of collision region A1 in which the vehicle 1 and the first vehicle 2 may actually collide based on the driving information of the vehicle 1 and the driving information of the first vehicle 2.

Conventionally, under the same conditions as the embodiment of FIGS. 5 and 6, the collision avoidance control of the vehicle 1 is performed even when a collision is unable to be prevented since the first vehicle 2 approaching from the rear lateral side of the vehicle 1 is not detected as the collision risk vehicle or a collision with the vehicle 1 is not expected based on the actual driving path of the first vehicle 2. However, the disclosure may prevent erroneous control of the collision avoidance control of the vehicle 1 and the first vehicle 2 by determining the expected collision region C1 in which a collision between the vehicle 1 and the first vehicle 2 is actually expected based on the driving information of the vehicle 1 and the driving information of the first vehicle 2 within the risk of collision region A1 between the vehicle 1 and the first vehicle 2 and may also prevent unnecessary control.

Particularly, the vehicle 1 may be configured to change the driving control amount of the vehicle 1 based on the expected collision region C1 determined as illustrated in FIG. 6 (1100). In other words, the vehicle 1 may be configured to set the weight for the collision avoidance control to be higher than a predetermined value with respect to the expected collision region C1 in the risk of collision region A1.

The vehicle 1 may be configured to operate the braking system 32 to decrease the driving speed of the vehicle 1 in response to determining that the vehicle 1 is being driven in the expected collision region C1. Further, in response to determining that the vehicle 1 is being driven in the expected collision region C1, the vehicle 1 may be configured to increase the driving braking amount of the vehicle 1 within the expected collision region C1 beyond the predetermined value, and advance a collision warning time of the vehicle 1 by the predetermined time with respect to the expected collision region C1.

In other words, when it is expected that the vehicle 1 and the first vehicle 2 will collide in the expected collision region C1, the vehicle 1 may be configured to increase the braking amount of the vehicle 1 greater than the predetermined value according to the weight given in advance in the expected collision region C1, advance the braking time by the predetermined time, and provide a collision warning to a driver in advance by the predetermined time.

Meanwhile, the vehicle 1 may be configured to output the collision warning information through the display 140 or the sound output device 160. In other words, the controller 100 may operate the display 140 or the sound output device 160 to output a collision risk warning sound between the vehicle 1 and the first vehicle 2 to inform the driver of the risk aurally, and display a collision risk message on the display 140 of the vehicle 1 to inform the driver of the risk visually. On the other hand, the vehicle 1 may be configured to set the weight for the collision avoidance control to be less than the predetermined value with respect to the remaining regions except for the expected collision region C1 within the risk of collision region A1.

Accordingly, when the vehicle 1 is driven to a region other than the expected collision region C1, the vehicle 1 may be configured to decrease the braking amount of the vehicle 1 to less than the predetermined value, delay the braking time by the predetermined time, and delay the collision warning time by the predetermined time. In other words, according to the exemplary embodiment of the disclosure, the expected collision region C1 between the vehicle 1 and the first vehicle 2 may be determined, the weight is given to the determined region, and the collision avoidance control amount of the vehicle 1 may be changed according to the given weight. In response to determining that the parking line marking PL is not recognized and there is the first vehicle 2 approaching from the rear lateral side of the vehicle 1 (1110), the vehicle 1 may be configured to determine the driving type as a second driving type in which the vehicle 1 is driven out of or beyond a place without parking line marking PL.

As illustrated in FIGS. 7 and 8, when the parking line marking PL around the vehicle 1 is not present and the other vehicles 3 and 4 parked on at least one of the front side and the rear side of the vehicle 1 are not present (e.g., no vehicles are detected on at least one of the front and rear vehicle side), and the first vehicle 2 approaches the vehicle 1 from the rear lateral side thereof, the vehicle 1 may be configured to determine the driving type of the vehicle 1 as a state where the vehicle 1 was not parked in the parking line marking PL (1120). In other words, in FIGS. 7 and 8, unlike the exemplary embodiment illustrated in FIGS. 5 and 6, the exemplary embodiment illustrates that the vehicle 1 is not parked in the parking line marking PL but stops on the shoulder of the road or a driving road side and starts driving to enter the driving lane. In other words, the vehicle 1 may be driven off the road shoulder and back into the driving lane of the road.

The vehicle 1 may be configured to determine a risk of collision region A2 between the vehicle 1 and the first vehicle 2 based on the second driving type of the vehicle 1 (1060). The vehicle 1 may be configured to determine the risk of collision region A2 of the vehicle 1 based on the steering angle of the vehicle 1 that varies based on the driving type of the vehicle 1 and a driving path m2 of the first vehicle 2 approaching from the rear lateral side of the vehicle 1. In particular, the steering angle of the vehicle 1 may be less when there is no the second vehicle 3 compared to the cases of FIGS. 5 and 6 in which the second vehicle 3 in front of the vehicle 1 is avoided and exits the parking area.

The driving path of the first vehicle 2 may also be determined based on whether the second vehicle 4 parked on the rear side of the vehicle 1 is present. The vehicle 1 may be configured to determine the risk of collision region A2 between the vehicle 1 and the first vehicle 2 according to the TTC calculated based on the exit direction of the vehicle 1 that has stopped on the shoulder of the road or the driving road side and the driving speed of the first vehicle 2 approaching from the rear lateral side.

The vehicle 1 does not give the weight to the parking line marking PL information and the position information of the other vehicles 3 and 4 but gives the predetermined weight to the obstacle information detected by the third and fourth corner radars 122c and 122d. In other words, the vehicle 1 may be configured to determine the risk of collision region A2 based on the detection information of the weighted first vehicle 2 in setting the risk of collision region A2 of the vehicle 1.

Referring to FIG. 8, the vehicle 1 may be configured to determine an expected collision region C2 between the vehicle 1 and the first vehicle 2 within the risk of collision region A2 based on the driving information of the vehicle 1 and the driving information of the first vehicle 2. Particularly, the driving information of the vehicle 1 may include information regarding the expected driving path of the vehicle 1 and the driving speed of the vehicle 1.

The vehicle 1 may be configured to obtain data on the expected driving path of the vehicle 1 in accordance with steering angle data of the steering wheel 10 detected by the steering angle detector of the vehicle 1. Additionally, the vehicle 1 may be configured to operate the speed detector to obtain driving speed data of the vehicle 1 in real time (1070). In other words, as illustrated in FIG. 8, the expected driving path of the vehicle 1 may be determined as r5, r6, r7, r8, r9 and r10 in accordance with the operation of the steering wheel 10 for entering the driving lane of the vehicle 1 which is stopped on the shoulder of the road or the driving road. The expected driving path of the vehicle 1 may change based on the steering angle based on the operation of the steering wheel and the driving speed of the vehicle 1.

The driving information of the first vehicle 2 may also include information regarding the expected driving path of the first vehicle 2 and the driving speed of the first vehicle 2. The vehicle 1 may be configured to obtain the change in the real-time position of the first vehicle 2 based on the obstacle information detected by the obstacle detector 120, and obtain the expected driving path of the first vehicle 2 and the driving speed information of the first vehicle 2 based on the obtained change in the real-time position of the first vehicle 2 (1080).

In addition, the vehicle 1 may be configured to determine the expected collision region C2 between the vehicle 1 and the first vehicle 2 within the risk of collision region A2 based on the driving information of the vehicle 1 and the driving information of the first vehicle 2 obtained in the manner as described above (1090). In other words, the vehicle 1 may be configured to set the risk of collision region A2 of the vehicle 1 based on the driving type of the vehicle 1 and information of the first vehicle 2, and set the expected collision region C2 in which the vehicle 1 and the first vehicle 2 are in actual collision within the risk of collision region A2 based on the driving information of the vehicle 1 and the driving information of the first vehicle 2.

Conventionally, under the same conditions as the embodiment of FIGS. 7 and 8, the collision avoidance control of the vehicle 1 is performed even when a collision is unable to be prevented since the first vehicle 2 approaching from the rear lateral side of the vehicle 1 is not detected as the collision risk vehicle or the collision with the vehicle 1 is not expected according to the actual driving path of the first vehicle 2. However, the disclosure may prevent erroneous control of the collision avoidance control of the vehicle 1 and the first vehicle 2 by determining the expected collision region C2 in which a collision between the vehicle 1 and the first vehicle 2 is actually expected based on the driving information of the vehicle 1 and the driving information of the first vehicle 2 within the risk of collision region A2 between the vehicle 1 and the first vehicle 2 and may also prevent unnecessary control.

Particularly, the vehicle 1 may be configured to change the driving control amount of the vehicle 1 based on the expected collision region C2 determined as illustrated in FIG. 8 (1100). In other words, the vehicle 1 may be configured to set the weight for the collision avoidance control to be greater than a predetermined value with respect to the expected collision region C2 in the risk of collision region A2. The vehicle 1 may be configured to operate the braking system 32 to decrease the driving speed of the vehicle 1 in response to determining that the vehicle 1 is being driven in the expected collision region C2.

Further, in response to determining that the vehicle 1 is being driven in the expected collision region C2, the vehicle 1 may be configured to increase the driving braking amount of the vehicle 1 within the expected collision region C2 to be greater than the predetermined value, and advance the collision warning time of the vehicle 1 by the predetermined time with respect to the expected collision region C2. In other words, when it is expected that the vehicle 1 and the first vehicle 2 will collide in the expected collision region C2, the vehicle 1 may be configured to increase the braking amount of the vehicle 1 to greater than the predetermined value according to the weight given in advance in the expected collision region C2, advance the braking time by the predetermined time, and provide a collision warning to a driver in advance by the predetermined time.

Meanwhile, the collision warning of the vehicle 1 may be provided to the driver through the display 140 and the sound output device 160. In other words, the vehicle 1 may be configured to operate the display 140 and the sound output device 160 to output the collision risk warning sound between the vehicle 1 and the first vehicle 2 to inform the driver of the risk. Additionally, the vehicle 1 may be configured to operate the display 140 to display the collision risk message on the display of the vehicle 1 to inform the driver of the risk visually. On the other hand, the vehicle 1 may be configured to set the weight for the collision avoidance control to be less than the predetermined value with respect to the remaining regions except for the expected collision region C2 within the risk of collision region A2.

Accordingly, when the vehicle 1 is driven to a region other than the expected collision region C2, the vehicle 1 may be configured to decrease the braking amount of the vehicle 1 to less than the predetermined value, delay the braking time by the predetermined time, and delay the collision warning time by the predetermined time. In other words, according to the exemplary embodiment of the disclosure, the expected collision region C2 between the vehicle 1 and the first vehicle 2 may be determined, the weight is given to the determined region, and the collision avoidance control amount of the vehicle 1 may be changed according to the given weight.

Referring to FIGS. 9 and 10, the vehicle 1 may be configured to perform the collision avoidance control of the vehicle 1 when the collision between the vehicle 1 and the first vehicle 2 approaching from the rear lateral side of the vehicle 1 is expected when the vehicle 1 makes the left turn or makes the U-turn while being driven.

The vehicle 1 may be configured to determine a risk of collision region A3 between the vehicle 1 and the first vehicle 2 according to a third driving type of the vehicle 1 making the left turn or the U-turn. At this time, the vehicle 1 may be configured to determine the risk of collision region A3 of the vehicle 1 based on a driving path a1 of the vehicle 1 making the left turn or the U-turn based on the steering angle of the vehicle 1 detected by the steering angle detector and the driving path of the first vehicle 2 approaching from the rear lateral side of the vehicle 1.

The driving path of the first vehicle 2 approaching the rear lateral side of the vehicle 1 may be determined by various paths such as m3, m4, m5, m6 and m7 as illustrated in FIG. 9 based on the steering wheel operation of the driver. Similarly to the vehicle 1, the first vehicle 2 may make the left turn or the U-turn at the intersection, and may be configured to determine the driving path for avoiding the vehicle 1. Accordingly, when the vehicle 1 makes the left turn or the U-turn, the vehicle 1 may be configured to determine the risk of collision region A3 based on the driving path r11 based on the steering angle of the vehicle 1 and the driving paths m3 to m7 of the first vehicle 2 approaching from the rear lateral side.

Particularly, the vehicle 1 may be configured to set the risk of collision region A3 between the vehicle 1 and the first vehicle 2 based on the left turn or the U-turn in the driving path of the vehicle 1 based on the steering angle of the vehicle 1 and the driving path of the first vehicle 2 determined based on the driving speed of the first vehicle 2. In other words, the vehicle 1 may be configured to set the risk of collision region A3 between the vehicle 1 and the first vehicle 2 according to the TTC calculated based on the left turn or the U-turn direction of the vehicle 1 or the driving road side and the driving speed of the first vehicle 2 approaching from the rear lateral side.

Referring to FIG. 10, the vehicle 1 may be configured to determine an expected collision region C3 between the vehicle 1 and the first vehicle 2 within the risk of collision region A3 based on the driving information of the vehicle 1 and the driving information of the first vehicle 2. Particularly, the driving information of the vehicle 1 may include information regarding the expected driving path of the vehicle 1 and the driving speed of the vehicle 1. The driving information of the first vehicle 2 may include information regarding the expected driving path of the first vehicle 2 and the driving speed of the first vehicle 2.

The vehicle 1 may be configured to set the expected collision region C3 between the vehicle 1 and the first vehicle 2 within the risk of collision region A3 based on the driving information of the vehicle 1 and the driving information of the first vehicle 2 obtained in the manner as described above. The vehicle 1 may be configured to change the driving control amount of the vehicle 1 when the vehicle 1 is driven in the expected collision region C3 and the collision with the first vehicle 2 is expected. In other words, the vehicle 1 may be configured to set the weight for the collision avoidance control to be greater than a predetermined value with respect to the expected collision region C3 in the risk of collision region A3.

Additionally, the vehicle 1 may be configured to operate the braking system 32 to decrease the driving speed of the vehicle 1 in response to determining that the vehicle 1 is driven in the expected collision region C3. Further, in response to determining that the vehicle 1 is being driven in the expected collision region C3, the vehicle 1 may be configured to increase the driving braking amount of the vehicle 1 within the expected collision region C3 beyond the predetermined value, and advance the collision warning time of the vehicle 1 by the predetermined time with respect to the expected collision region C3.

The vehicle 1 may be configured to output collision warning information to the driver through at least one of the display 140 and the sound output device 160. In other words, the vehicle 1 may be configured to operate at least one of the display 140 and the sound output device 160 to output the collision risk warning sound between the vehicle 1 and the first vehicle 2. Additionally, the vehicle 1 may be configured to operate the display 140 to display the collision risk message on the display of the vehicle 1 to inform the driver of the risk visually.

Figure 11:
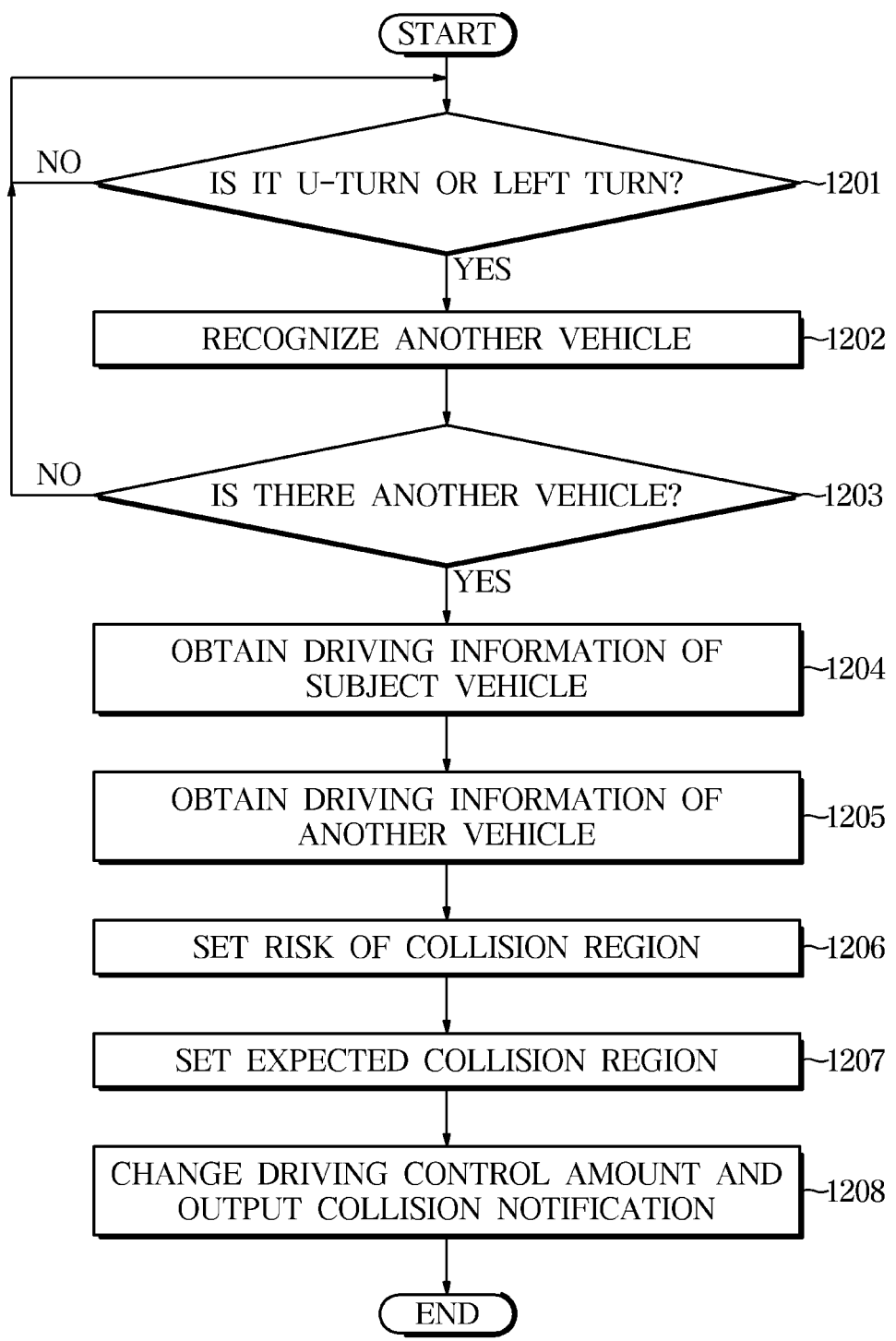
FIG. 11 is a flowchart illustrating a control flow when a vehicle is driving in a U-turn according to an exemplary embodiment of the disclosure.
Figure 12:
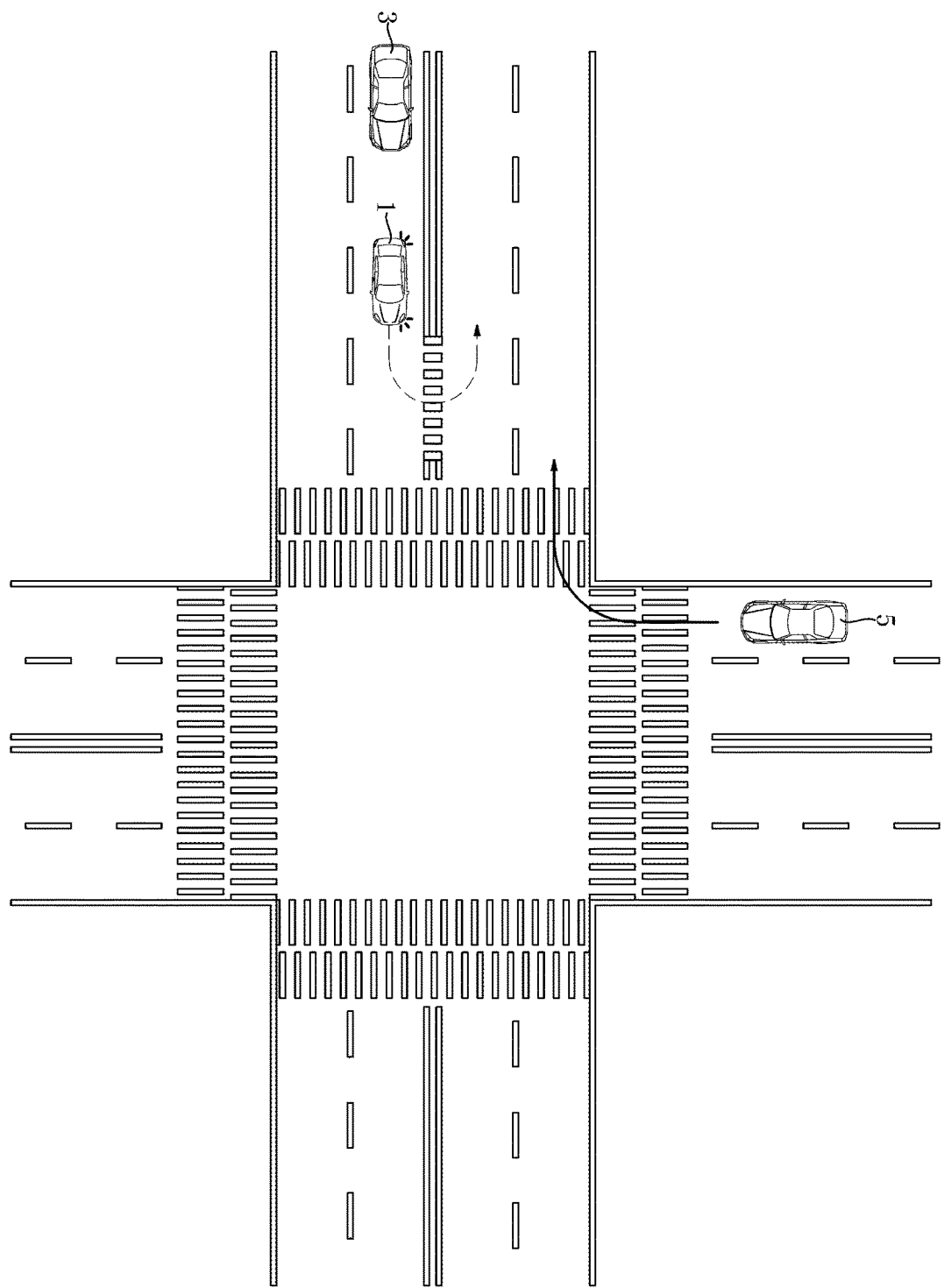
FIG. 12 is a view illustrating a U-turn driving of a vehicle according to an exemplary embodiment of the disclosure.
Figure 13:
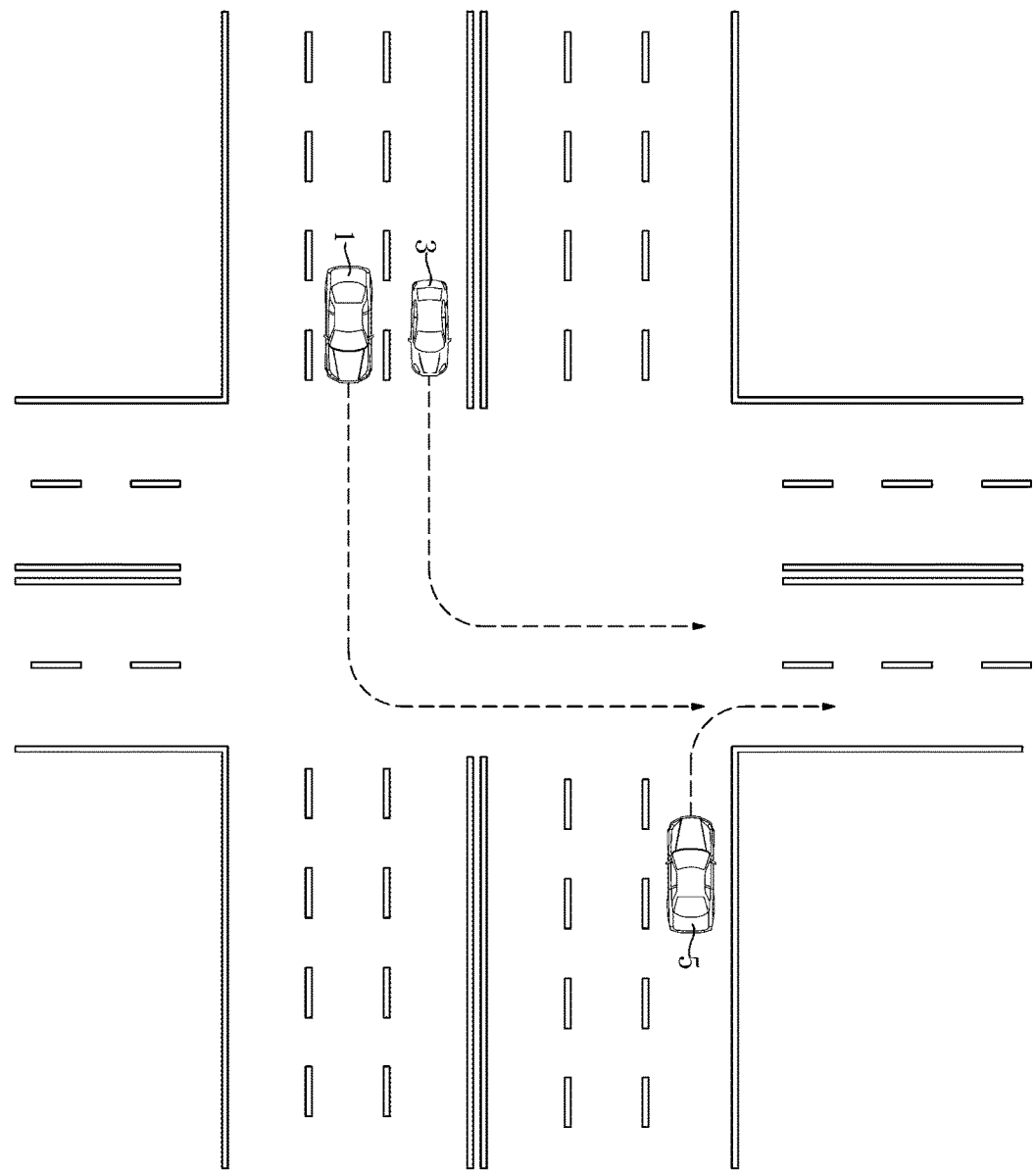
FIG. 13 is a view illustrating a left turn driving of a vehicle according to an exemplary embodiment of the disclosure.
Figure 14:
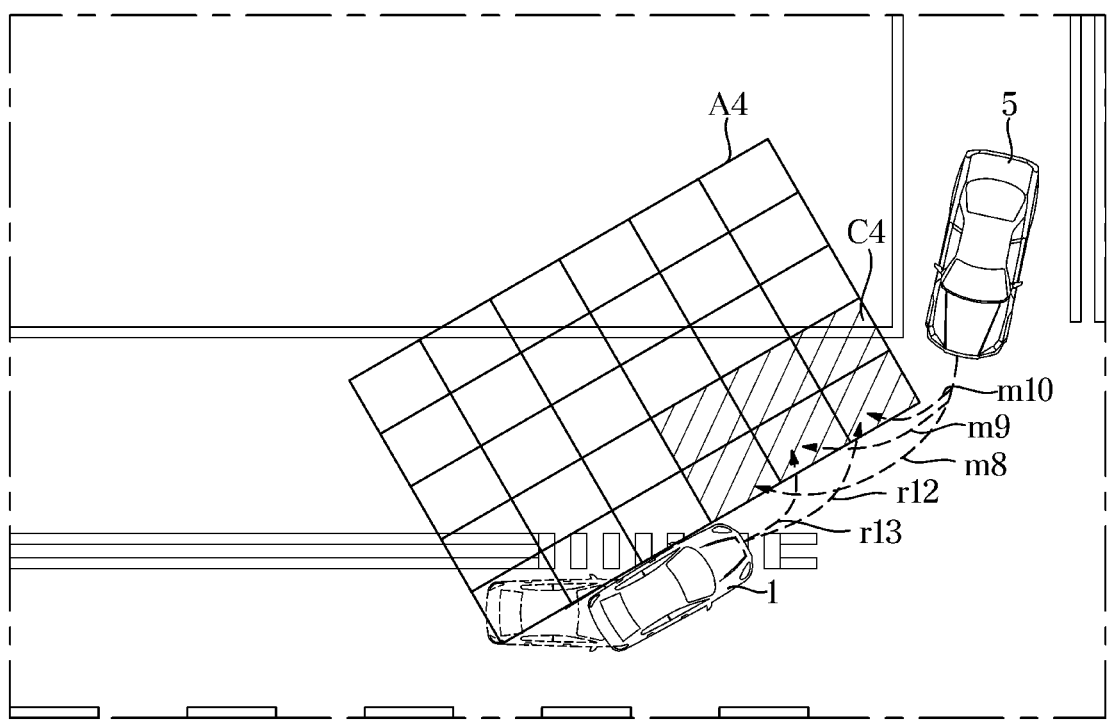
FIG. 14 is a view illustrating setting a risk of collision region and an expected collision region when a vehicle is driving in a left turn according to an exemplary embodiment of the disclosure.

FIG. 11 is a flowchart illustrating a vehicle control according to another exemplary embodiment, and is a flowchart illustrating a control flow when performing the U-turn or the left turn. This will be described with reference to FIGS. 12 to 14. FIG. 12 is a view illustrating a U-turn driving of a vehicle according to an exemplary embodiment of the disclosure, FIG. 13 is a view illustrating a left turn driving of a vehicle according to an exemplary embodiment of the disclosure, and FIG. 14 is a view illustrating setting a risk of collision region and an expected collision region when a vehicle is driving in a left turn according to an exemplary embodiment of the disclosure.

The vehicle 1 may be configured to determine whether the driving intention of the user is the left turn intention or the U-turn intention based on the image information obtained by the imager 110 while being driven (1201). In particular, determining whether the driving intention of the user is the left turn intention or the U-turn intention may include determining whether the on signal of the left turn indication lamp or the on signal of a left direction indication lever has been received.

The determination of whether the driving intention of the user is the left turn intention or the U-turn intention is to determine whether the road surface marking displayed on the road is one of the left turn marking RM1, the U-turn marking RM2, and the left turn/U-turn simultaneous marking based on the image information obtained from the imager 110. In response to determining any one of the left turn marking RM1, the U-turn marking RM2, and the left turn/U-turn simultaneous marking, the vehicle 1 may be configured to determine the driving intention of the user as the left turn intention or the U-turn intention.

In the determination of whether the driving intention of the user is the left turn intention or the U-turn intention, it may also be possible to determine whether the driving intention of the user is the left turn intention or the U-turn intention based on the steering angle information among the driving information detected by the driving information detector 60, and may include determining whether the path guidance information is left turn information or U-turn information based on the navigation information. The steering angle for the U-turn intention may be larger than the steering angle for the left turn intention.

As illustrated in FIGS. 13 and 14, when performing the U-turn or the left turn driving, the collision may occur between the vehicle 1 and another vehicle 5 (i.e., the third vehicle) in front of the vehicle 1. During the U-turn driving, the third vehicle 5 may be a vehicle that performs a right turn among vehicles driving in a direction crossing the subject vehicle. During left turn driving, the third vehicle 5 may be a vehicle that performs the right turn among vehicles driving in a direction opposite to the subject vehicle.

To prevent this, the vehicle 1 may be configured to recognize surrounding vehicles based on the image information when performing the U-turn driving or the left turn driving (1202), and determine whether there is the third vehicle 5 driving from the front lateral side but turning right among the recognized surrounding vehicles (1203). In particular, the third vehicle 5 may be a vehicle with high possibility of driving in the same lane as the subject vehicle when the subject vehicle performs the U-turn or the left turn.

The vehicle 1 may be configured to obtain the driving information from the detection information detected by the driving information detector 60 (1204), and obtain the driving information of the third vehicle 5 from the obstacle information detected by the obstacle detector 120 (1205). The driving information of the vehicle 1 may include the steering angle information detected by the steering angle detector and the driving speed information detected by the speed detector.

When the vehicle 1 obtains the driving information of the third vehicle 5, the vehicle 1 may be configured to recognize the third vehicle 5 from the image information obtained by the imager 110 and obtain the driving information for the third vehicle 5 recognized from the obstacle information detected by the obstacle detector 120. In other words, the vehicle 1 may be configured to obtain the change in the real-time position of the third vehicle 5 based on the image information obtained by the imager 110, obtain the driving path of the third vehicle 5 based on the obtained change in the real-time position, and obtain the driving speed information of the third vehicle 5.

The vehicle 1 may be configured to obtain a driving path r12 of the vehicle 1 based on the steering angle information of the subject vehicle of the vehicle 1, obtain the driving path m8 of the third vehicle 5 based on the obtained position change of the third vehicle 5, and set the risk of collision region A4 of the vehicle 1 based on the obtained driving path r12 of the vehicle 1 and the obtained driving path m8 of the third vehicle 5 (1206). The vehicle 1 may be configured to obtain the TTC based on the driving direction of the vehicle 1 and the driving speed of the third vehicle 5 approaching from the front lateral side, and set the risk of collision region A4 between the vehicle 1 and the third vehicle 5 according to the obtained TTC. In addition, when performing the left turn driving or the U-turn driving, the vehicle 1 may be configured to set the weights to various pieces of information detected by the imager 110 and the obstacle detector 120, and set the risk of collision region A4 having the plurality of regions with different degrees of risk based on the set weight.

The obstacle detector 120 may include the front radar 121 having a front field of view, and the first, second, third, and fourth corner radars 122a, 122b, a22c, and 122d having a front left and right view and a rear left and right view. In addition, the obstacle detector 120 may include a Lidar or an ultrasonic wave having the front view and the rear view, and may include the Lidar having the front left and right view and the rear left and right view. In particular, the vehicle 1 may be configured to set the largest first weight value in a region having the field of view of the imager 110, set a second weight value in a region corresponding to the front field of view and the front left and right field of view of the obstacle detector 120, and set the smallest third weight value in a region corresponding to the front field of view and the front left and right field of view of the obstacle detector 120 among the plurality of regions.

The vehicle 1 may be configured to obtain expected driving paths r12 and r13 of the vehicle 1 based on the steering angle information of the steering wheel 10 detected by the steering angle detector of the vehicle 1 and driving speed information. In particular, the expected driving path set by the steering angle information of the steering wheel 10 may vary according to the driving speed of the vehicle 1. The vehicle 1 may be configured to set the expected collision region C4 between the vehicle 1 and the third vehicle 3 within the risk of collision region A4 based on the driving information of the vehicle 1 and the driving information of the third vehicle 5 (1207).

Particularly, the driving information of the vehicle 1 may include information regarding the expected driving paths r12 and r13 of the vehicle 1 and the driving speed of the vehicle 1. Further, the driving information of the third vehicle 5 may include information regarding expected driving paths m8, m9, and m10 of the third vehicle 5 and the driving speed of the third vehicle 5.

Referring to FIG. 14, the vehicle 1 may be configured to set the expected collision region C4 between the vehicle 1 and the third vehicle 5 within the risk of collision region A4 based on the driving information of the vehicle 1 and the driving information of the third vehicle 5 during the left turn driving. During the U-turn or the left turn driving, the vehicle 1 may change the amount of control of the vehicle 1, such as the steering or the driving speed of the vehicle 1, based on at least one of the set expected collision region and the risk of collision region, and output through at least one of the display 140 and the sound output device 160 to output the driving guidance information or the warning information for collision avoidance (1208).

The vehicle 1 may be configured to operate the display 140 and the sound output device 160 to output the collision risk warning sound between the vehicle 1 and the third vehicle 5 to inform the driver of the risk. Additionally, the vehicle 1 may be configured to operate the display 140 to display the collision risk message on the display of the vehicle 1 to inform the driver of the risk visually.

The disclosure may prevent erroneous control of the collision avoidance control of the vehicle 1 and the third vehicle 5 by determining the expected collision region C4 in which the collision between the vehicle 1 and the third vehicle 5 is actually expected based on the driving information of the vehicle 1 and the driving information of the third vehicle 5 within the risk of collision region A4 between the vehicle 1 and the third vehicle 5 and may also prevent unnecessary control.

Particularly, the vehicle 1 may be configured to change the driving control amount of the vehicle 1 based on the set expected collision region C4. In other words, the vehicle 1 may be configured to set the weight for the collision avoidance control to be greater than a predetermined value with respect to the expected collision region C4 in the risk of collision region A4. The vehicle 1 may be configured to operate the braking system 32 to decrease the driving speed of the vehicle 1 in response to determining that the vehicle 1 is being driven in the expected collision region C4.

Further, in response to determining that the vehicle 1 is being driven in the expected collision region C4, the vehicle 1 may be configured to increase the driving braking amount of the vehicle 1 within the expected collision region C4 beyond the predetermined value, and advance a collision warning time of the vehicle 1 by the predetermined time with respect to the expected collision region C4. In other words, when it is expected that the vehicle 1 and the third vehicle 5 will collide in the expected collision region C4, the vehicle 1 may be configured to increase the braking amount of the vehicle 1 greater than the predetermined value according to the weight given in advance in the expected collision region C4, advance the braking time by the predetermined time, and provide a collision warning to a driver in advance by the predetermined time.

On the other hand, the vehicle 1 may be configured to set the weight for the collision avoidance control to be less than the predetermined value with respect to the remaining regions except for the expected collision region C4 within the risk of collision region A4. Accordingly, when the vehicle 1 is driven to a region other than the expected collision region C4, the vehicle 1 may be configured to decrease the braking amount of the vehicle 1 to less than the predetermined value, delay the braking time by the predetermined time, and delay the collision warning time by the predetermined time.

As described above, according to the vehicle and the method of controlling the vehicle according to the exemplary embodiment of the disclosure, there is an effect of assisting the collision avoidance system by performing the collision avoidance control under special conditions, such as when the parked vehicle exits the parking line PL while driving in parallel with another vehicle approaching in the side lane, or the vehicle 1 makes the left turn or the U-turn. In addition, erroneous control conditions related to collision avoidance that may occur during driving of the vehicle may be prevented.

The disclosure may prevent the collision with another vehicle driving in the rear side or the lateral side during the U-turn or the left turn. The disclosure may prevent accidents with other vehicles in advance. The disclosure may also provide improved user convenience, improve the marketability of the vehicle, and further increase the user's satisfaction, improve user convenience and reliability, and secure product competitiveness.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed exemplary embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above exemplary embodiments are only by way of example, and should not be interpreted in a limited sense.

What is claimed is:

1. A vehicle, comprising:
    an imager configured to obtain an image of a surrounding object, and output image information about the obtained image;
    an obstacle detector configured to detect an obstacle, and output obstacle information about the detected obstacle;
    a driving information detector configured to detect driving information including a steering angle, and a driving speed, and output the driving information; and
    a controller configured to:
        identify whether the vehicle has changed from a parking state to a driving state based on at least one of the image information obtained by the imager or the driving information detected by the driving information detector,
        when it is identified that the vehicle has changed from the parking state to the driving state and in response to the obstacle driving in a side lane corresponding to the steering angle, obtain a path of the obstacle and a driving speed of the obstacle based on the obstacle information,
        obtain a driving path of the vehicle based on the steering angle,
        set a first risk of collision region of the vehicle based on the driving path of the vehicle and the path of the obstacle,
        set a first expected collision region in the first risk of collision region based on the driving speed of the vehicle, the driving path of the vehicle, the path of the obstacle, and the driving speed of the obstacle,
        set a control weight of the first expected collision region higher than a control weight of a first remaining region in the first risk of collision region,
        control a braking amount of the vehicle based on the set control weight for each region,
        detect a road surface marking displayed on a road based on the image information obtained from the imager while the vehicle is driving,
        in response to determining that the recognized road surface marking is at least one of a U-turn line or a U-turn marking, set a second risk of collision region of the vehicle based on at least one of the image information, the obstacle information, or the driving information, and
        perform collision avoidance control based on the first risk of collision region of the vehicle or the second risk of collision region of the vehicle,
    wherein the first risk of collision region of the vehicle is different from the second risk of collision region of the vehicle.

2. The vehicle according to claim 1, wherein the controller is configured to
    adjust at least one of steering or braking based on the second risk of collision region while the vehicle is driving.

3. The vehicle according to claim 2, wherein the controller is configured to:
    set a second expected collision region in the second risk of collision region based on the driving speed of the vehicle, the obtained path of the vehicle, the path of the obstacle, and the obtained driving speed of the obstacle while the vehicle is driving;
    set a control weight of the second expected collision region higher than a control weight of a second remaining region in the second risk of collision region, and
    adjust at least one of the steering or the braking based on the set control weight for each region.

4. The vehicle according to claim 3,
    wherein the braking amount of the first expected collision region is greater than the braking amount of the first remaining region, and
    wherein the braking amount of the second expected collision region is greater than the braking amount of the second remaining region.

5. The vehicle according to claim 3, wherein the controller is configured to reduce a timing of outputting information about the risk of collision with the obstacle by a predetermined time within the set second expected collision region.

6. The vehicle according to claim 2, wherein the controller is configured to:
    divide the second set the risk of collision region into a plurality of regions;
    set a first weight in a region corresponding to a field of view of the imager among the divided plurality of regions;
    set a second weight in a region corresponding to front left and right field of views of the obstacle detector;
    set a third weight in a region corresponding to a rear view of the obstacle detector; and
    adjust at least one control amount of the steering or the braking based on weights set in the plurality of regions.

7. The vehicle according to claim 1, wherein the controller is configured to recognize vehicles driving in an intersection direction based on the image information obtained from the imager, and recognize a vehicle performing a right turn among the recognized vehicles as the obstacle that can collide during a U-turn driving.

8. The vehicle according to claim 1, wherein the controller is configured to:
    in response to determining that the recognized road surface marking is at least one of a left turn line or a left turn marking, detect the obstacle that may collide during a left turn driving is detected based on the image information and the obstacle information;
    generate a driving path by the left turn driving based on the steering angle; and
    perform collision avoidance control with the recognized obstacle based on the generated driving path by the left turn driving.

9. The vehicle according to claim 8, wherein the controller is configured to detect opposite vehicles driving in opposite directions based on the image information obtained from the imager, and detect a vehicle performing a right turn among the detected opposite vehicles having a collision risk during the left turn driving.

10. The vehicle according to claim 1, further comprising:
at least one of a display configured to display collision avoidance information with the detected obstacle as an image in response to a control command of the controller; and
a sound output device configured to output the collision avoidance information with the detected obstacle as a sound in response to the control command of the controller.

11. The vehicle according to claim 1, further comprising:
an input device configured to receive destination information; and
a communicator configured to receive current position information,
wherein the controller is configured to generate navigation information based on the current position information and the destination information, and determine whether the vehicle is driving a U-turn based on the generated navigation information.

12. A method of controlling a vehicle comprising:
identifying, by a controller, whether the vehicle has changed from a parking state to a driving state based on at least one of image information obtained by an imager or driving information detected by a driving information detector,
obtaining, by the controller, when it is identified that the vehicle has changed from the parking state to the driving state and in response to the obstacle driving in a side lane corresponding to the steering angle, a path of the obstacle and a driving speed of the obstacle based on the obstacle information,
obtaining a driving path of the vehicle based on the steering angle,
setting, by the controller, a first risk of collision region of the vehicle based on the driving path of the vehicle and the path of the obstacle,
setting, by the controller, a first expected collision region in the first risk of collision region based on the driving speed of the vehicle, the obtained path of the vehicle, the path of the obstacle, and the driving speed of the obstacle,
setting, by the controller, a control weight of the first expected collision region higher than a control weight of a first remaining region in the first risk of collision region,
controlling, by the controller, a braking amount of the vehicle based on the set control weight for each region,
determining, by the controller, whether a driving intention of a user is a U-turn intention or a left turn intention based on the image information obtained by the imager, while the vehicle is driving;
in response to determining that the driving intention of the user is the U-turn intention or the left turn intention, setting, by the controller, a second risk of collision region of the vehicle based on at least one of the image information or the obstacle information detected by the obstacle detector or the driving information; and
performing, by the controller, collision avoidance control based on the first risk of collision region of the vehicle or the second risk of collision region of the vehicle,
wherein the first risk of collision region of the vehicle is different from the second risk of collision region of the vehicle.

13. The method according to claim 12, wherein the determining of whether the driving intention of the user is the U-turn intention or the left turn intention includes:
detecting a road surface marking displayed on a road based on the image information;
determining whether the recognized road surface marking is at least one of a U-turn line or a U-turn marking; and
determining whether the detected road surface marking is at least one of a left turn line or a left turn marking.

14. The method according to claim 12, wherein the determining of whether the driving intention of the user is the U-turn intention or the left turn intention includes:
determining whether an on signal of a left turn indication lamp or an on signal of a left direction indication lever has been received; and
determining whether the U-turn intention or the left turn intention of the user based on the steering angle of the vehicle.

15. The method according to claim 12, wherein the setting the second risk of collision region includes:
obtaining a driving path of the vehicle based on the steering angle;
obtaining a position change of the detected obstacle based on the obstacle information;
obtaining a path of the obstacle based on the obtained position change of the obstacle; and
setting the second risk of collision region based on the path of the vehicle and the path of the obstacle.

16. The method according to claim 15, further comprising:
setting a second expected collision region in the risk of collision region based on driving speed information of the vehicle, the obtained path of the vehicle, the path of the obstacle, and the obtained driving speed information of the obstacle while the vehicle is driving;
setting a control weight of the second expected collision region higher than a control weight of a second remaining region in the second risk of collision region, and control a braking amount of the vehicle; and
adjusting at least one of the steering or the braking based on the set control weight for each region.

17. The method according to claim 16, wherein the adjusting of at least one of the steering or the braking comprises:
increasing a braking amount of the vehicle above a predetermined value within the second set expected collision region.

18. The method according to claim 16, further comprising:
reducing a timing of outputting information about the risk of collision with the obstacle by a predetermined time within the second set expected collision region.

19. The method according to claim 16, wherein the adjusting of at least one of the steering or the braking includes:
dividing the second risk of collision region into a plurality of regions;
setting a first weight in a region corresponding to a field of view of the imager among the divided plurality of regions;
setting a second weight in a region corresponding to front left and right field of views of the obstacle detector;
setting a third weight in a region corresponding to a rear view of the obstacle detector; and
adjusting at least one control amount of the steering or the braking based on weights set in the plurality of regions.

20. The method according to claim 12, further comprising:

outputting collision avoidance information with the detected obstacle as an image or a sound.

\* \* \* \* \*